(12) United States Patent
Koito

(10) Patent No.: US 11,874,567 B2
(45) Date of Patent: Jan. 16, 2024

(54) DISPLAY DEVICE

(71) Applicant: Japan Display Inc., Tokyo (JP)

(72) Inventor: Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/970,812

(22) Filed: Oct. 21, 2022

(65) Prior Publication Data

US 2023/0130451 A1 Apr. 27, 2023

(30) Foreign Application Priority Data

Oct. 25, 2021 (JP) .................................. 2021-173573

(51) Int. Cl.
*G02F 1/1343* (2006.01)
*G02F 1/1335* (2006.01)

(52) U.S. Cl.
CPC .. *G02F 1/134336* (2013.01); *G02F 1/133512* (2013.01)

(58) Field of Classification Search
CPC ......... G02F 1/134336; G02F 1/133512; G02B 30/26; G02B 30/30; G02B 30/31; G02B 30/32

See application file for complete search history.

(56) References Cited

U.S. PATENT DOCUMENTS

| 2014/0022472 A1* | 1/2014 | Kikuchi | H04N 13/31 349/15 |
| 2015/0362740 A1* | 12/2015 | Hamagishi | H04N 13/366 359/462 |
| 2016/0065951 A1* | 3/2016 | Hamagishi | H04N 13/317 348/59 |

FOREIGN PATENT DOCUMENTS

JP 2013-231745 A 11/2013

* cited by examiner

*Primary Examiner* — Edward J Glick
*Assistant Examiner* — David Y Chung
(74) *Attorney, Agent, or Firm* — K&L Gates LLP

(57) ABSTRACT

According to an aspect, a display device includes: a display panel including a plurality of pixels disposed in a matrix having a row-column configuration; and a light control panel configured to control light traveling from the display panel to a plurality of viewpoints such that the light varies from viewpoint to viewpoint. The pixels include a first pixel configured to output light in a first color and a second pixel configured to output light in a second color. The first and second pixels are arranged in a column direction orthogonal to an arrangement direction of the viewpoints. A width of each pixel in a row direction along the arrangement direction of the viewpoints is greater than a width of the pixel in the column direction.

9 Claims, 17 Drawing Sheets

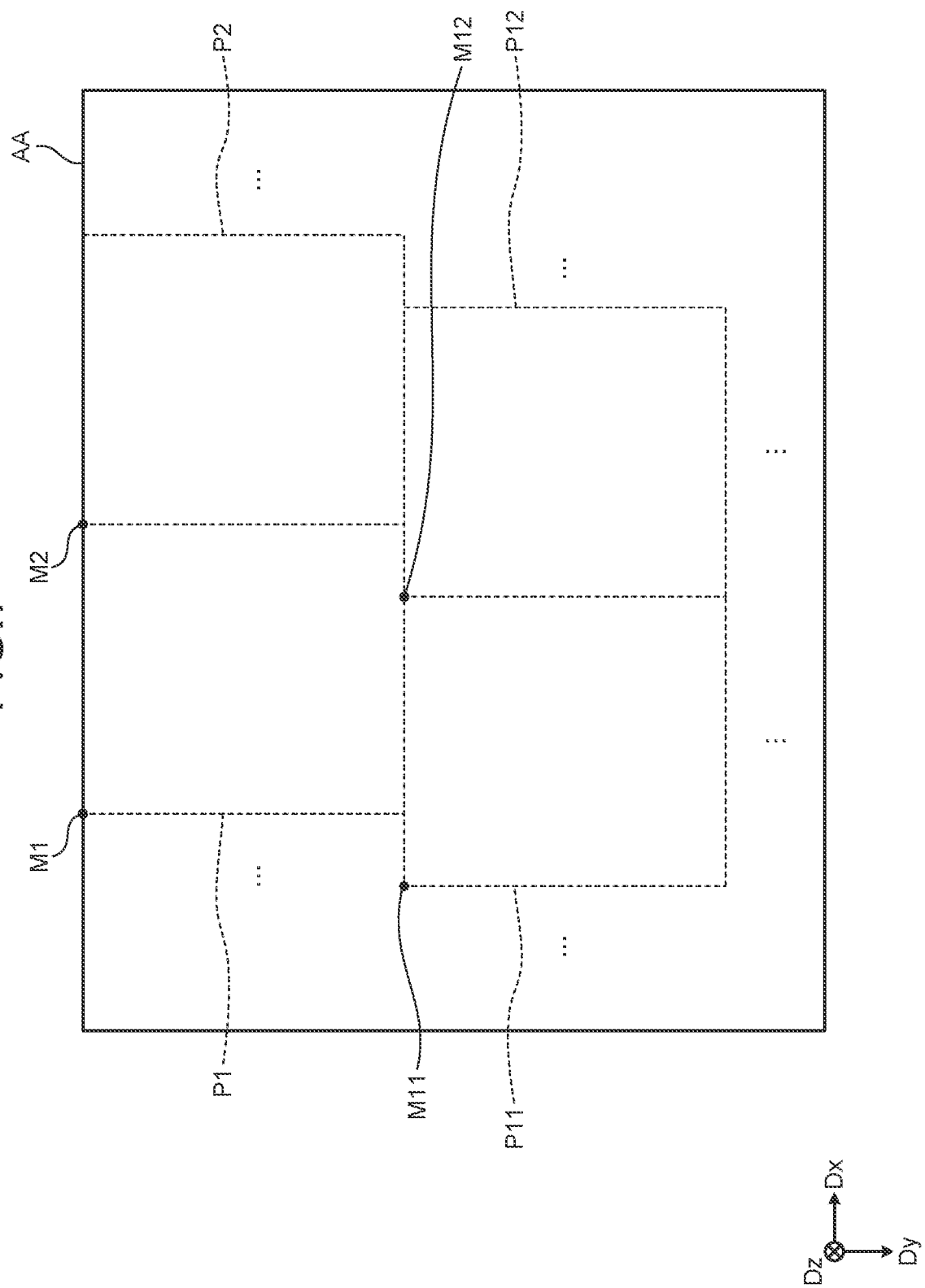

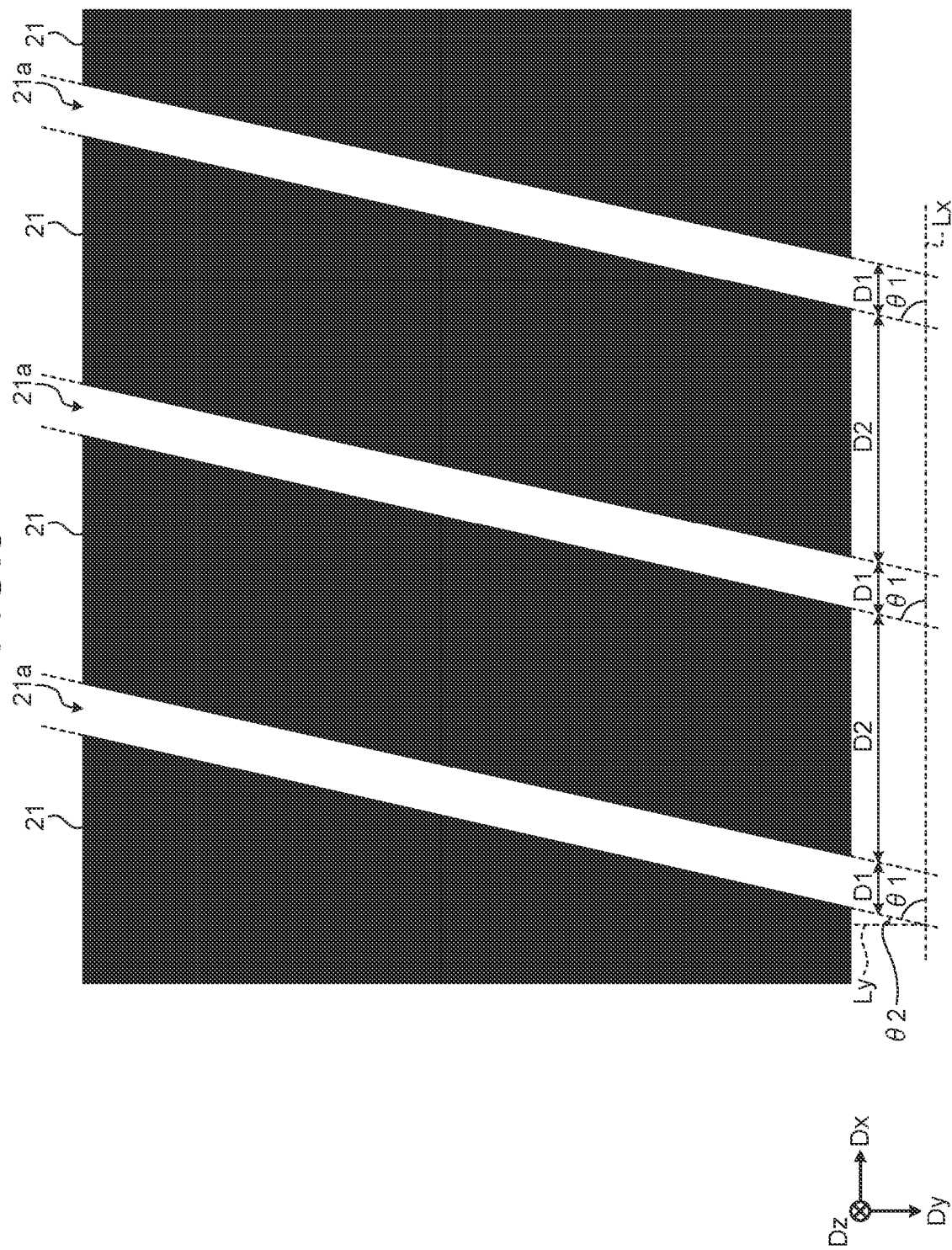

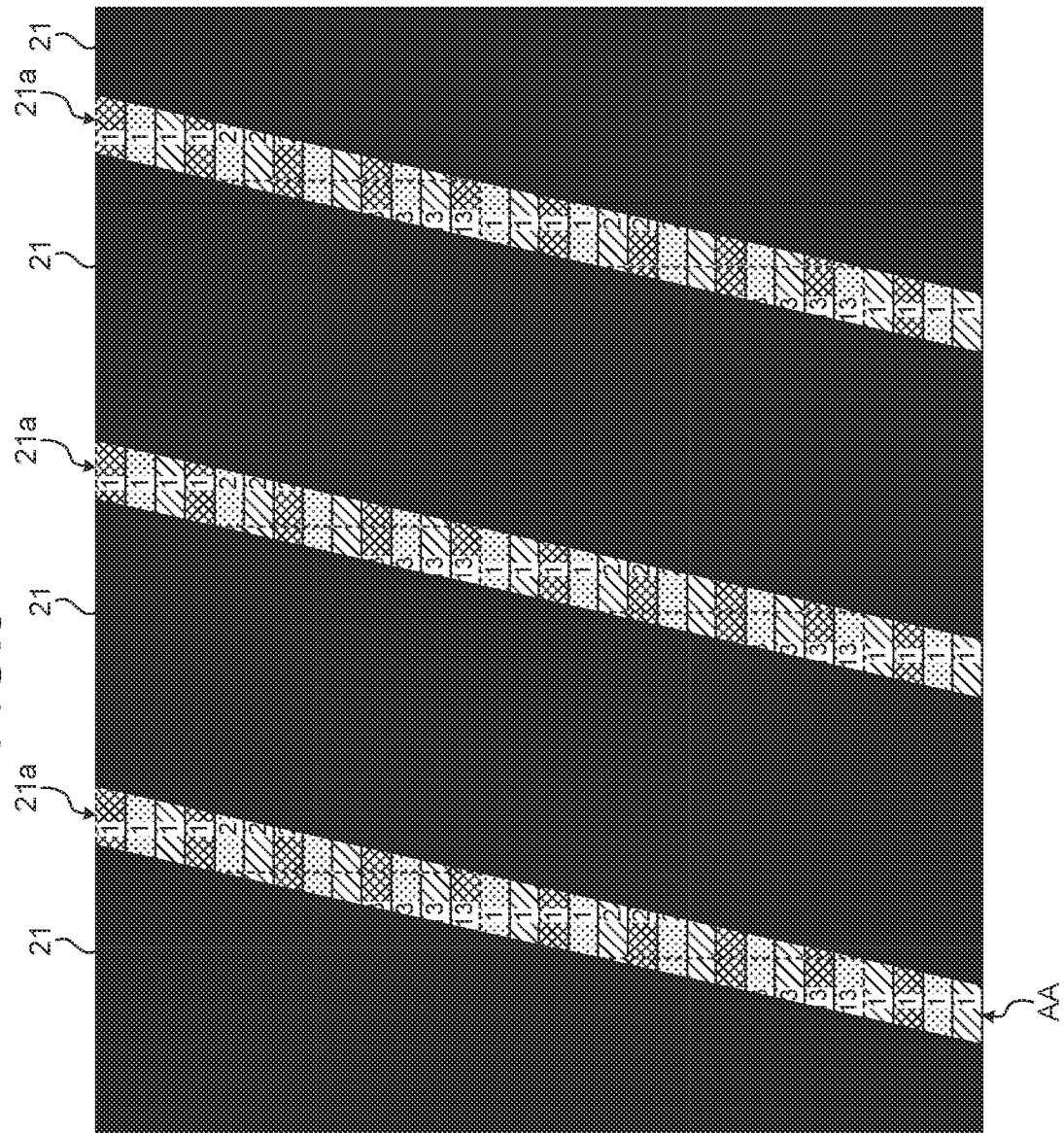
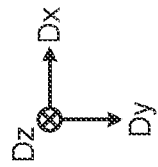

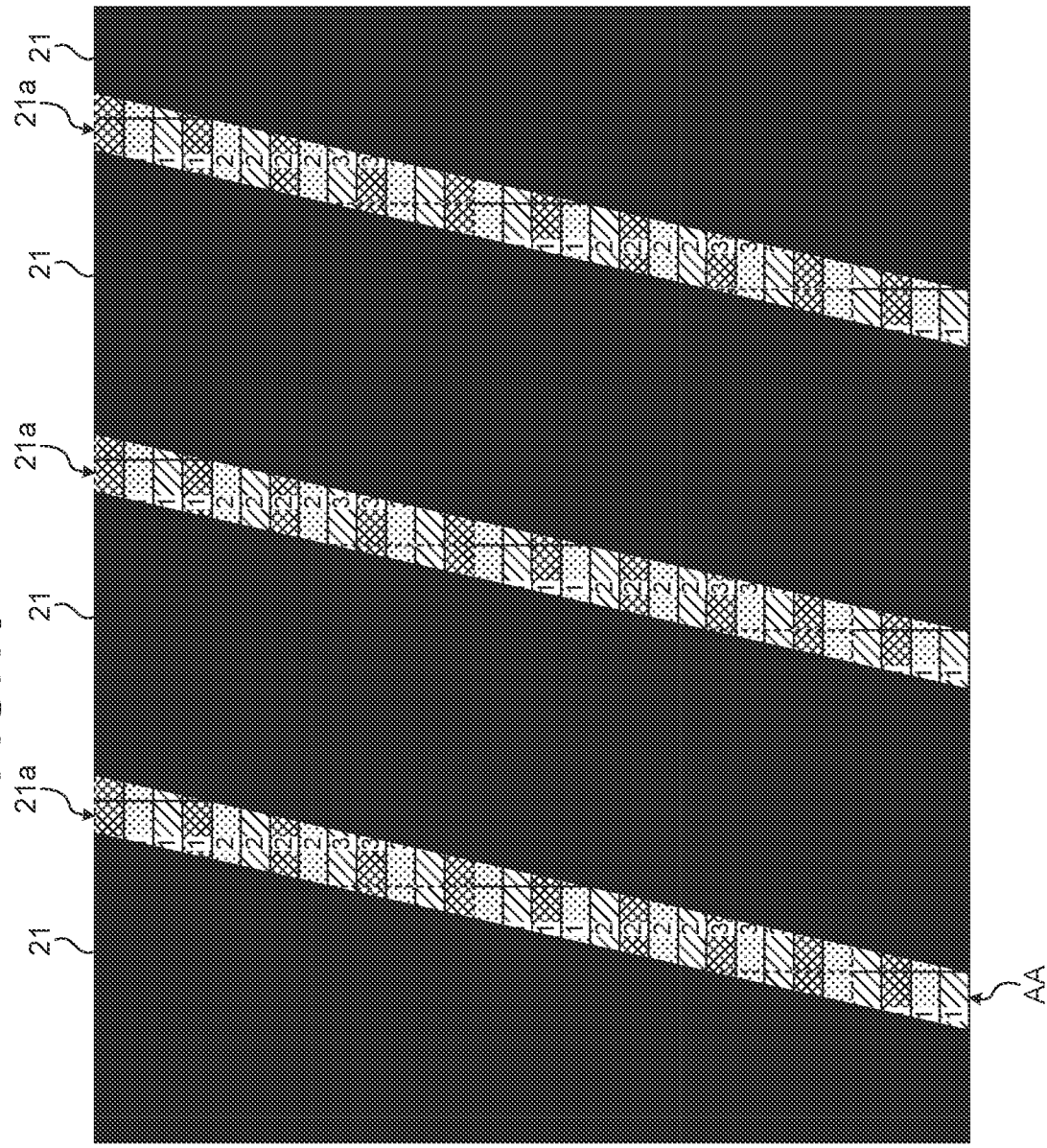

FIG.19
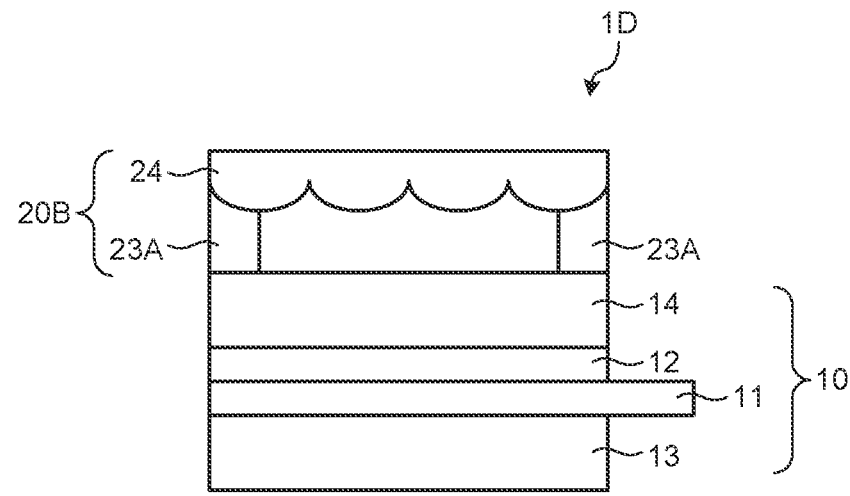
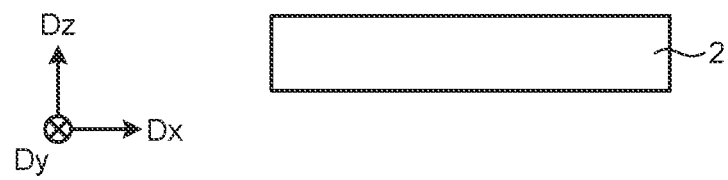
FIG.20
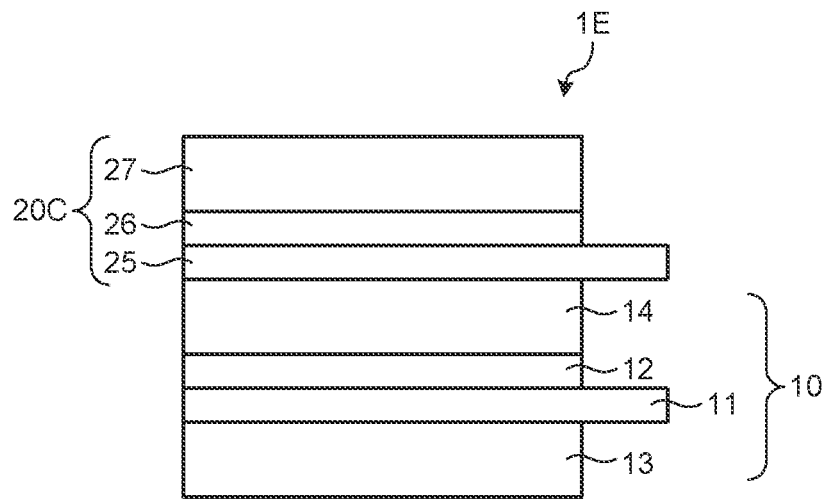
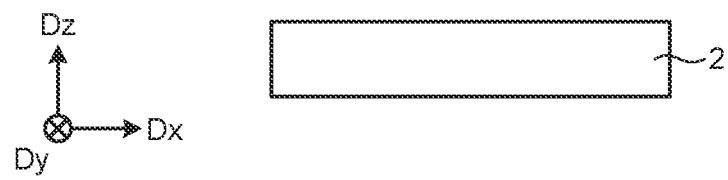

FIG.21

DISPLAY DEVICE

CROSS-REFERENCE TO RELATED APPLICATION

This application claims the benefit of priority from Japanese Patent Application No. 2021-173573 filed on Oct. 25, 2021, the entire contents of which are incorporated herein by reference.

BACKGROUND

1. Technical Field

What is disclosed herein relates to a display device.

2. Description of the Related Art

As described in Japanese Patent Application Laid-open Publication No. 2013-231745 (JP-A-2013-231745), a display device capable of outputting different images to different viewpoints has been known.

In the display device disclosed in JP-A-2013-231745, color pixels of a plurality of colors are arranged in the arrangement direction of a plurality of viewpoints, and each color pixel has a longer width in the arrangement direction of the viewpoints than a width in a direction orthogonal to the arrangement direction of the viewpoints. With such a configuration, the colors of light traveling from the color pixels to the viewpoints are different from one another in some cases. In such a case, unintended coloring occurs to an image visually recognized at each viewpoint.

For the foregoing reasons, there is a need for a display device capable of further reducing unintended coloring.

SUMMARY

According to an aspect, a display device includes: a display panel including a plurality of pixels disposed in a matrix having a row-column configuration; and a light control panel configured to control light traveling from the display panel to a plurality of viewpoints such that the light varies from viewpoint to viewpoint. The pixels include a first pixel configured to output light in a first color and a second pixel configured to output light in a second color. The first and second pixels are arranged in a column direction orthogonal to an arrangement direction of the viewpoints. A width of each pixel in a row direction along the arrangement direction of the viewpoints is greater than a width of the pixel in the column direction.

BRIEF DESCRIPTION OF THE DRAWINGS

FIG. 7 is a diagram illustrating a positional relation between four partial regions adjacent to each other among a plurality of partial regions illustrated in FIG. 5;

FIG. 8 is a diagram illustrating an exemplary form of a plurality of light-blocking members provided on a light control panel and slits formed between the light-blocking members;

FIG. 9 is a schematic diagram illustrating output from the display device when viewed from a viewpoint E(1);

FIG. 10 is a schematic diagram illustrating output from the display device when viewed from a viewpoint E(2);

FIG. 19 is a schematic diagram illustrating an exemplary configuration of the display device;

FIG. 20 is a schematic diagram illustrating an exemplary configuration of the display device;

FIG. 21 is a diagram illustrating an exemplary partial region different from the partial regions described with reference to FIGS. 6 and 12;

DETAILED DESCRIPTION

An embodiment of the present disclosure is described below with reference to the drawings. What is disclosed herein is only an example, and any changes that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
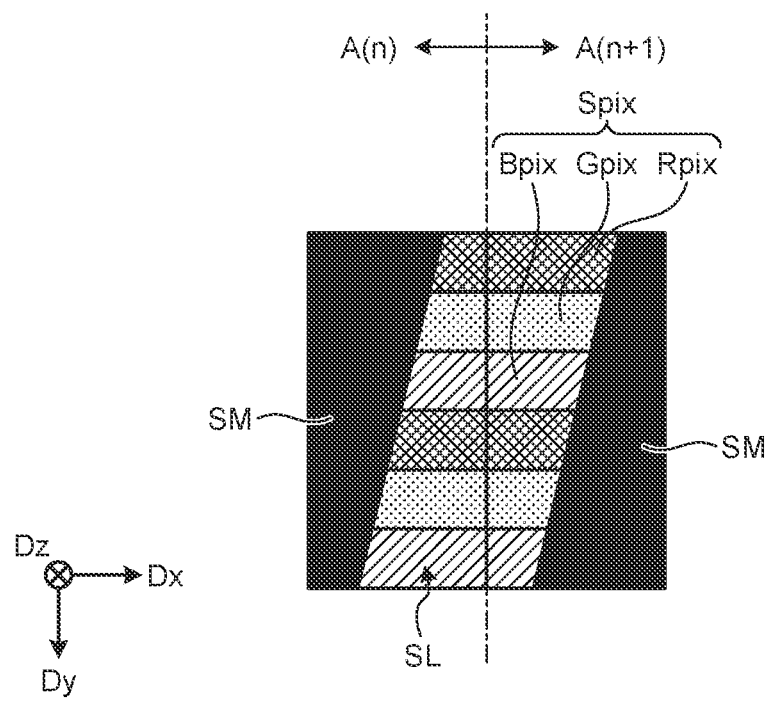
FIG. 1 is a schematic diagram illustrating the basic principle of a method of outputting individual images to a plurality of viewpoints by a display device according to the present disclosure.
Figure 2:
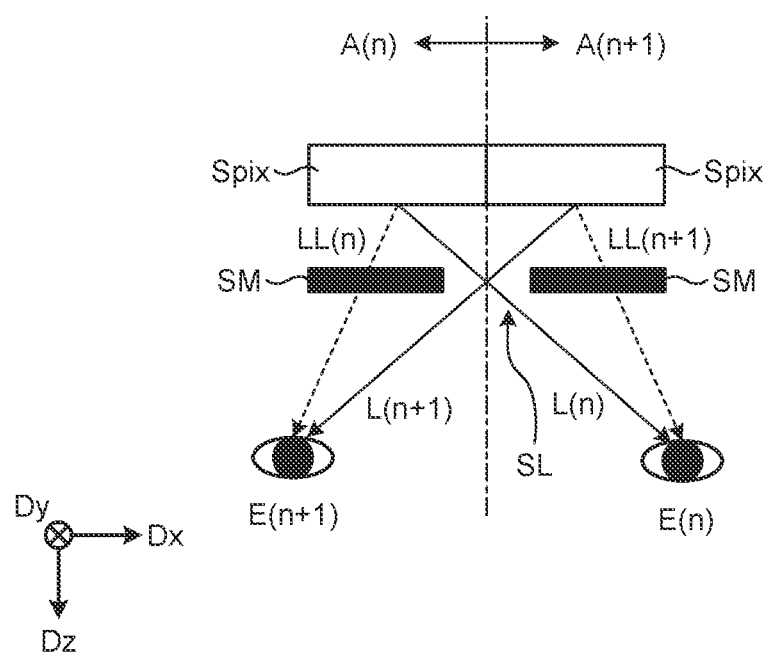
FIG. 2 is a schematic diagram illustrating the basic principle of the method of outputting individual images to a plurality of viewpoints by the display device according to the present disclosure.

FIGS. 1 and 2 are each a schematic diagram illustrating the basic principle of a method of outputting individual images to a plurality of viewpoints by a display device according to the present disclosure. In the following description, a first direction Dx is defined as the arrangement direction of a plurality of viewpoints E(n) and E(n+1), the arrangement direction of the pixels Spix (for example, a first pixel Rpix, a second pixel Gpix, or a third pixel Bpix) along the longitudinal direction of pixels Spix, or the extending direction of scanning lines to be described later. A second direction Dy is defined as a direction orthogonal to the first direction Dx and along an image display surface. A third direction Dz is defined as a direction orthogonal to the first direction Dx and the second direction Dy.

The display device according to the present disclosure includes the pixels Spix and light-blocking members SM. The width of each pixel Spix in the first direction Dx is greater than the width thereof in the second direction Dy. In FIG. 1 and other drawings according to the present disclosure, the first pixel Rpix, the second pixel Gpix, and the third pixel Bpix are exemplarily illustrated as the examples of the pixels Spix. The first pixel Rpix outputs light having a spectrum peak to be visually recognized as red. In other words, the first pixel Rpix is a red pixel Spix when viewed by a user. The second pixel Gpix outputs light having a spectrum peak to be visually recognized as green. In other words, the second pixel Gpix is a green pixel Spix when viewed by the user. The third pixel Bpix outputs light having a spectrum peak to be visually recognized as blue. In other words, the third pixel Bpix is a blue pixel Spix when viewed by the user. Each pixel Spix is not limited thereto but may output light having a spectrum peak to be visually recognized as a color other than red, green, and blue. For example, a white pixel Spix may be additionally provided when viewed by the user. One unit pixel is made up of the first pixel Rpix, the second pixel Gpix, and the third pixel Bpix adjacent to each other, and the unit pixels are arrayed in a matrix having a row-column configuration in a display region AA (refer to FIG. 5).

The pixels Spix are two-dimensionally disposed along a plane orthogonal to the third direction Dz. FIG. 1 exemplarily illustrates a pixel column A(n) and a pixel column A(n+1) in which the pixels Spix are arranged from one side to the other side in the second direction Dy in the order of the first pixel Rpix, the second pixel Gpix, and the third pixel Bpix. The pixel column A(n) and the pixel column A(n+1) are arranged in the first direction Dx. In examples of the present disclosure, the pixels Spix of the same color are arranged in the first direction Dx but the present disclosure is not limited thereto, and the pixels Spix of different colors may be arranged in the first direction Dx.

Each light-blocking member SM blocks part of light that is output from the pixel Spix such that the emission line of the light that is output from the pixel Spix is limited to a particular viewpoint. Specifically, as illustrated in FIG. 2, the light-blocking member SM blocks light LL(n) traveling from the pixel column A(n) toward the viewpoint E(n+1). Another light-blocking member SM blocks light LL(n+1) traveling from the pixel column A(n+1) toward the viewpoint E(n). Light L(n) traveling from the pixel column A(n) toward the viewpoint E(n) and light L(n+1) traveling from the pixel column A(n+1) toward the viewpoint E(n+1) pass through a slit SL between the two light-blocking members SM. In this manner, an image output from the pixel column A(n) can be visually recognized at the viewpoint E(n), and an image output from the pixel column A(n+1) can be visually recognized at the viewpoint E(n+1). The pixels Spix in the pixel column A(n) and the pixel column A(n+1) face the viewpoint E(n) and the viewpoint E(n+1) in the third direction Dz with the light-blocking members SM interposed therebetween. The positional relation between the pixel column A(n) and the pixel column A(n+1) in the first direction Dx is opposite to the positional relation between the viewpoint E(n) and the viewpoint E(n+1) in the first direction Dx.

In the example illustrated in FIG. 1, the slit SL through which light can pass between the light-blocking members SM is inclined relative to the first direction Dx and the second direction Dy. However, the arrangement direction of the pixels Spix in the pixel column A(n) and the pixel column A(n+1) extends along the second direction Dy. In this manner, the slit SL is inclined relative to the arrangement direction of the pixels Spix, thereby reducing more.

Although the most basic method of outputting individual images to two viewpoints (the viewpoints E(n) and E(n+1)) is described with reference to FIGS. 1 and 2, the display device according to the present disclosure can output individual images to three viewpoints or more. The following describes an exemplary configuration and control of the display device when individual images are output to three viewpoints or more with reference to FIGS. 3 to 14.

Figure 3:
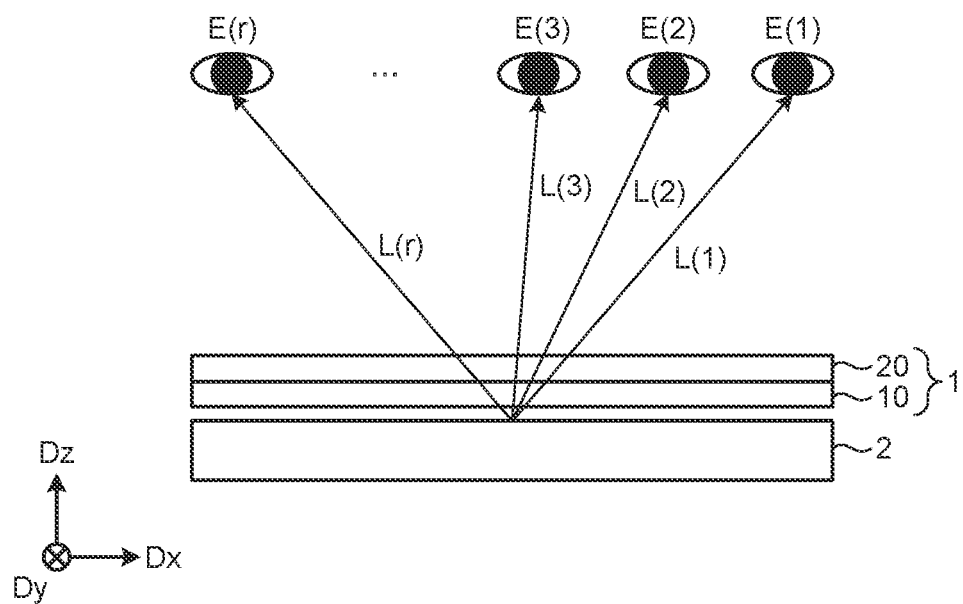
FIG. 3 is a schematic diagram illustrating an exemplary configuration of a display system capable of outputting individual images to r viewpoints.

FIG. 3 is a schematic diagram illustrating an exemplary configuration of a display system capable of outputting individual images to r viewpoints. The display system includes a display device 1 and a light source device 2. The display device 1 includes a display panel 10 and a light control panel 20. The display panel 10 overlaps the light control panel 20 when viewed in the third direction Dz.

The display panel 10 is a transmissive liquid crystal display panel. The display panel 10 includes the display region AA (refer to FIG. 5) in which a plurality of pixels Spix such as the first pixel Rpix, the second pixel Gpix, and the third pixel Bpix described above are disposed. The light control panel 20 functions as the above-described light-blocking members SM. A specific configuration of the light control panel 20 will be described later.

The light source device 2 is provided opposing viewpoints E(1), E(2), E(3), . . . , E(r) with the display device 1 interposed therebetween. The light source device 2 includes a light source configured to emit light to the display device 1. The display device 1 transmits light from the light source device 2 and outputs light L(1), L(2), L(3), . . . , L(r) to the viewpoints E(1), E(2), E(3), . . . , E(r). The number r is a natural number. The viewpoints E(1), E(2), E(3), . . . , E(r) may be viewpoints of different users or may be viewpoints generated as the relative positions of the display device 1 and a user change, for example, when the user moves relative to the display device 1.

Figure 4:
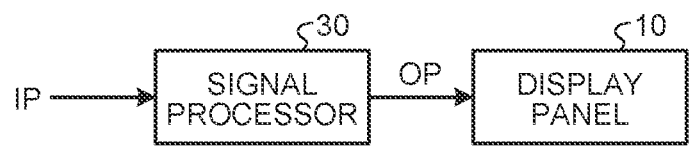
FIG. 4 is a block diagram illustrating a configuration related to an input system of a signal to a display panel.

FIG. 4 is a block diagram illustrating a configuration related to an input system of a signal to the display panel 10. The display panel 10 is coupled to a signal processor 30. The signal processor 30 generates an output image OP based on an input image IP that is input from an external apparatus (host). The signal processor 30 outputs the output image OP to the display panel 10. Each pixel Spix of the display panel 10 performs outputting in accordance with the output image OP.

Figure 5:
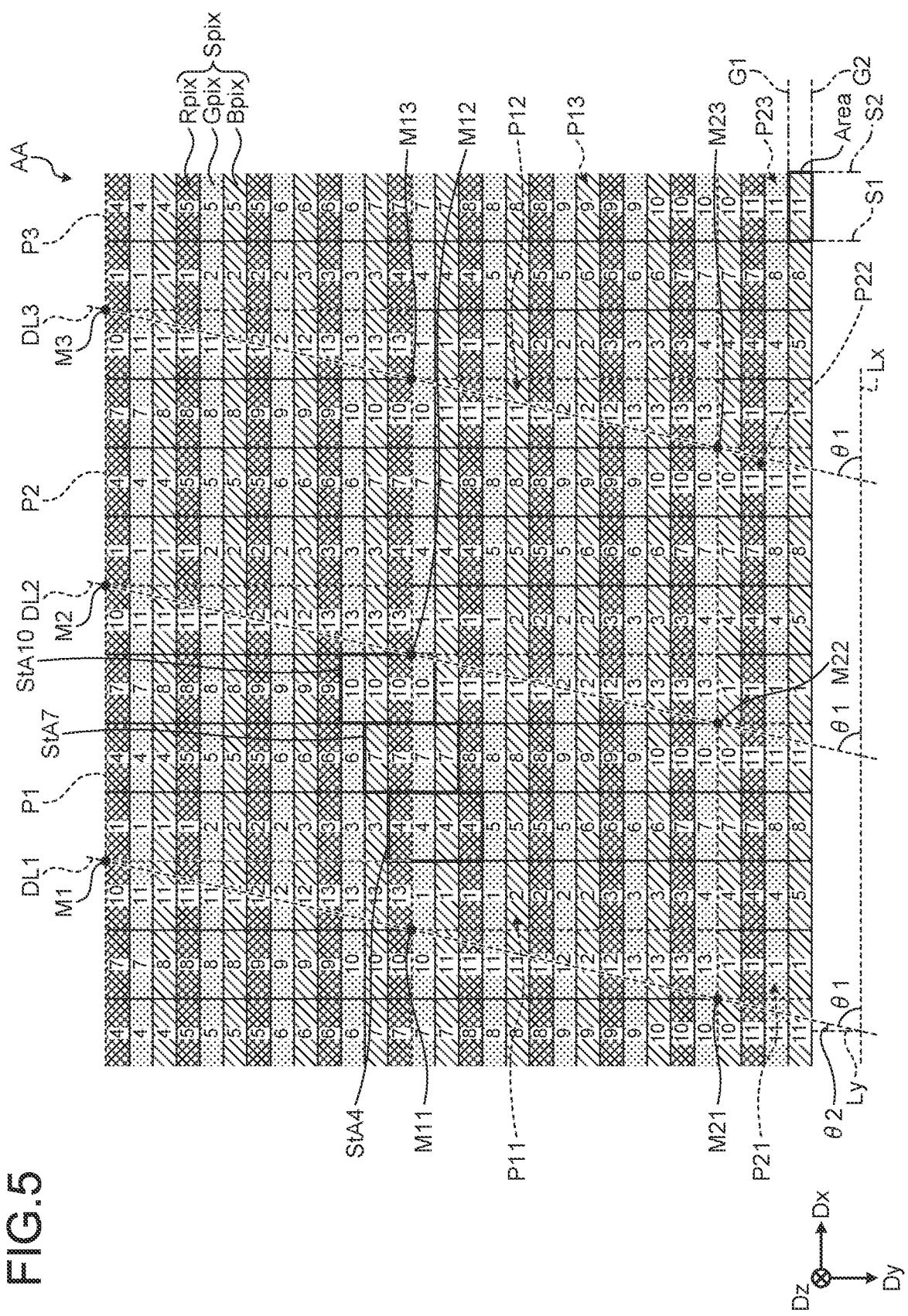
FIG. 5 is a schematic diagram illustrating an exemplary relation between an arrangement of pixels in a display region and viewpoints E as targets of individual images output from the respective pixels.

FIG. 5 is a schematic diagram illustrating an exemplary relation between an arrangement of pixels Spix (first pixels Rpix, second pixels Gpix, and third pixels Bpix) in the display region AA and viewpoints E as targets of individual images output from the pixels Spix. In FIGS. 5 to 14 and FIG. 21 to be described later, the viewpoints E as targets of individual images output from the pixels Spix are distinguished from one another by numbers. For example, each pixel Spix in FIG. 5 is denoted by any natural number of 1 to 13. The pixels Spix with the same number output light forming an image for the same viewpoint. The pixels Spix with different numbers output light included in images to different viewpoints E. Thus, FIG. 5 illustrates an example in which individual images are output to 13 viewpoints. In other words, r in FIG. 3 is 13 in the example illustrated in FIG. 5.

Specifically, first pixels Rpix, second pixels Gpix, and third pixels Bpix denoted by the number "1" are pixels Spix that output an individual image to the viewpoint E(1). First pixels Rpix, second pixels Gpix, and third pixels Bpix denoted by the number "2" are pixels Spix that output an individual image to the viewpoint E(2). According to the same principle, first pixels Rpix, second pixels Gpix, and third pixels Bpix denoted by the number "t" are pixels Spix that output an individual image to the viewpoint E(t). Light emitted from the light source device 2 and transmitted through the pixel Spix that outputs an individual image to the viewpoint E(t), reaches the viewpoint E(t) as light L(t). The number t is a natural number equal to or smaller than r.

In the display device according to the present disclosure, the pixels Spix that output an individual image to the same viewpoint E are continuously arranged in the second direction Dy. In the example illustrated in FIG. 5, four pixels Spix denoted by the same number (any of 1 to 13) are continuously arranged in the second direction Dy.

In the display device according to the present disclosure, the relation between the number and disposition of pixels Spix included in a partial region P (refer to FIG. 6) and individual images allocated to the pixels Spix in the partial region P is fixed.

Figure 6:
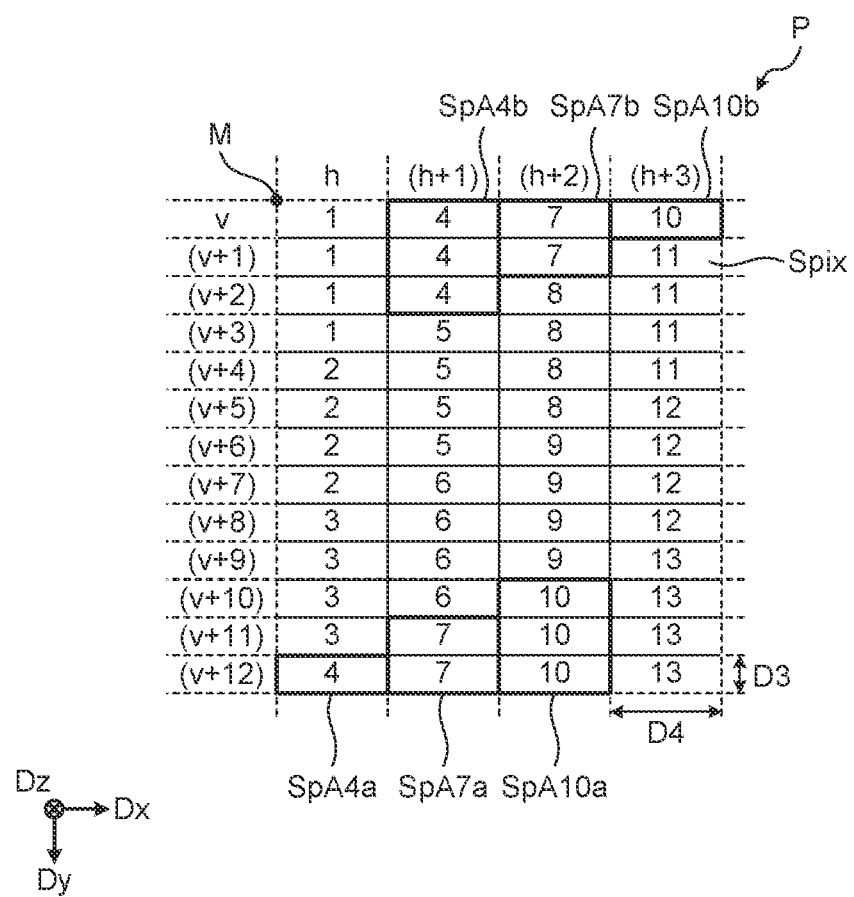
FIG. 6 is a diagram illustrating a relation between the number and disposition of pixels included in a partial region P and an individual image allocated to each pixel in the partial region.

FIG. 6 is a diagram illustrating the relation between the number and disposition of pixels Spix included in the partial region P and individual images allocated to the pixels Spix in the partial region P. The partial region P illustrated in FIG. 6 includes pixels Spix of DxxDy=4×13. In description with reference to FIG. 6, the positions of the pixels Spix in the partial region P are distinguished by coordinates h, (h+1), (h+2), and (h+3) in the first direction Dx and coordinates v, (v+1), (v+2), (v+3), (v+4), (v+5), (v+6), (v+7), (v+8), (v+9), (v+10), (v+11), and (v+12) in the second direction Dy. The position of the pixel Spix is described as, for example, (Dx, Dy)=(h, v) when described with a combination of a coordinate in the first direction Dx and a coordinate in the second direction Dy.

In the partial region P illustrated in FIG. 6, four pixels Spix positioned at (Dx, Dy)=(h, v), (h, (v+1)), (h, (v+2)), and (h, (v+3)) are denoted by the number "1". Thus, the four pixels Spix output an individual image to the viewpoint E(1). Four pixels Spix positioned at (Dx, Dy)=(h, (v+4)), (h, (v+5)), (h, (v+6)), and (h, (v+7)) output an individual image to the viewpoint E(2). Four pixels Spix positioned at (Dx, Dy)=(h, (v+8)), (h, (v+9)), (h, (v+10)), and (h, (v+11)) output an individual image to the viewpoint E(3).

Thus, in principle, the pixels Spix that output the individual image to one viewpoint E(t) are continuously arranged in the second direction Dy in the partial region P. In the example illustrated in FIG. 6, in addition to the viewpoints E(1), E(2), and E(3) described above, pixels Spix that output an individual image to any one of the viewpoints E(5), E(6), E(8), E(9), E(11), E(12), and E(13) are continuously arranged in the second direction Dy in the partial region P.

The number of pixels Spix arranged in the second direction Dy in the partial region P illustrated in FIG. 6 is 13. The number of continuous pixels Spix that output an individual image to one viewpoint E(t) is 4. Thus, the continuation of four pixels Spix in the partial region P that output an individual image to one viewpoint E(t) cannot be applied to all viewpoints E(t). Therefore, for some viewpoints E(t) (for example, the viewpoints E(4), E(7), and E(10)), pixels Spix that output an individual image to one viewpoint E(t) are dispersively disposed in the partial region P.

Specifically, four pixels Spix positioned at (Dx, Dy)=(h, (v+12)), ((h+1), v), ((h+1), (v+1)), and ((h+1), (v+2)) output an individual image to the viewpoint E(4). Four pixels Spix positioned at (Dx, Dy)=((h+1), (v+11)), ((h+1), (v+12)), ((h+2), v), and ((h+2), (v+1)) output an individual image to the viewpoint E(7). Four pixels Spix positioned at (Dx, Dy)=((h+2), (v+10)), ((h+2), (v+11)), ((h+2), (v+12)), and ((h+3), v) output an individual image to the viewpoint E(10).

A region in which pixels Spix that output an individual image to the viewpoint E(4) are disposed, is divided into two regions: a region SpA4a of (Dx, Dy)=(h, (v+12)) and a region SpA4b of (Dx, Dy)=((h+1), v), ((h+1), (v+1)), and ((h+1), (v+2)). A region in which pixels Spix that output an individual image to the viewpoint E(7) are disposed, is divided into two regions: a region SpA7a of (Dx, Dy)=((h+1), (v+11)) and ((h+1), (v+12)) and a region SpA7b of (Dx, Dy)=((h+2), v) and ((h+2), (v+1)). A region in which pixels Spix that output an individual image to the viewpoint E(10) are disposed, is divided into two regions: a region SpA10a of (Dx, Dy)=((h+2), (v+10)) and ((h+2), (v+11)), and ((h+2), (v+12)) and a region SpA10b of (Dx, Dy)=((h+3), v).

The region SpA4a includes the pixel Spix at (h, (v+12)). The region SpA4b includes the pixel Spix at ((h+1), v). The region SpA7a includes the pixel Spix at ((h+1), (v+12)). The region SpA7b includes the pixel Spix at ((h+2), v). The region SpA10a includes the pixel Spix at ((h+2), (v+12)). The region SpA10b includes the pixel Spix at ((h+3), v). Thus, for some viewpoints E(t) (for example, the viewpoints E(4), E(7), and E(10)), pixels Spix that output an individual image to one viewpoint E(t) and are dispersively disposed in the partial region P, are dispersed in a region SpA(t)a including the pixel Spix at (Dx, Dy)=(j, kmax) and a region SpA(t)b including the pixel Spix at (Dx, Dy)=(j+1, kmin). The numbers j and j+1 represent adjacent coordinates (for example, h and (h+1) illustrated in FIG. 6) in the first direction Dx. The number kmax represents an end coordinate (for example, (v+12) illustrated in FIG. 6) in the second direction Dy. The number kmin represents a start coordinate (for example, v illustrated in FIG. 6) in the second direction Dy. Thus, the region SpA(t)b is at a cyclic position relative to the region SpA(t)a with the coordinate in the first direction Dx incremented by one. The cyclic position is a position on one end side (kmin side) relative to the other end side (kmax side) in the second direction Dy.

Rectangular partial regions P1, P2, P3, P11, P12, P13, P21, P22, and P23 illustrated in FIG. 5 are each the partial region P described with reference to FIG. 6. In FIG. 5, the position of one of the four apexes of each partial region P (partial regions P1, P2, P3, P11, P12, P13, P21, P22, or P23) is denoted by a marker (marker M1, M2, M3, M11, M12, M13, M21, M22, or M23). The position of the marker of each partial region P corresponds to the position of a marker M in the partial region P illustrated in FIG. 6.

The partial regions P1 and P2 are adjacent to each other in the first direction Dx. The partial regions P2 and P3 are adjacent to each other in the first direction Dx. The partial regions P11 and P12 are adjacent to each other in the first direction Dx. The partial regions P12 and P13 are adjacent to each other in the first direction Dx. The partial regions P21 and P22 are adjacent to each other in the first direction Dx. The partial regions P22 and P23 are adjacent to each other in the first direction Dx. The partial regions P1 and P11 are adjacent to each other in the second direction Dy. The partial regions P11 and P21 are adjacent to each other in the second direction Dy. The partial regions P2 and P12 are adjacent to each other in the second direction Dy. The partial regions P12 and P22 are adjacent to each other in the second direction Dy. The partial regions P2 and P12 are adjacent to each other in the second direction Dy. The partial regions P12 and P22 are adjacent to each other in the second direction Dy. Thus, individual image allocation to each pixel Spix is performed to fill the display region AA with a plurality of partial regions P.

Although not illustrated, the same principle as that of the individual image allocation to each pixel Spix in the partial region P described with reference to FIG. 6 is also applied to regions opposing the partial regions P2, P12, and P22 with the partial regions P3, P13, and P23 interposed therebetween. Although not denoted by reference signs, the same principle as that of the individual image allocation to each pixel Spix in the partial region P described with reference to FIG. 6 is also applied to regions opposing the partial regions P2, P12, and P22 with the partial regions P1, P11, and P21 interposed therebetween.

FIG. 7 is a diagram illustrating the positional relation between four partial regions P (the partial regions P1, P2, P11, and P12) adjacent to each other among a plurality of partial regions P illustrated in FIG. 5. As illustrated in FIGS. 5 and 7, in the display device according to the present disclosure, the positions of two partial regions P adjacent to each other in the second direction Dy are shifted from each other in the first direction Dx. For example, as illustrated in FIGS. 5 and 7, the partial regions P1 and P11 are adjacent to each other in the second direction Dy. The position of the partial region P1 in the first direction Dx is shifted from the position of the partial region P11 in the first direction Dx. The partial regions P2 and P12 are adjacent to each other in the second direction Dy. The position of the partial region P2 in the first direction Dx is shifted from the position of the partial region P12 in the first direction Dx.

Similarly, as illustrated in FIG. 5, the partial regions P11 and P21 are adjacent to each other in the second direction Dy. The position of the partial region P11 in the first direction Dx is shifted from the position of the partial region P21 in the first direction Dx. The partial regions P12 and P22 are adjacent to each other in the second direction Dy. The position of the partial region P12 in the first direction Dx is shifted from the position of the partial region P22 in the first direction Dx. The partial regions P3 and P13 are adjacent to each other in the second direction Dy. The position of the partial region P3 in the first direction Dx is shifted from the position of the partial region P13 in the first direction Dx. In the example illustrated in FIG. 5, a positional shift amount in the first direction Dx between two partial regions P adjacent to each other in the second direction Dy is equal to a width D4 (refer to FIG. 6) of one pixel Spix in the first direction Dx.

With the positional shift in the first direction Dx between two partial regions P adjacent to each other in the second direction Dy, the region SpA(t)b (refer to FIG. 6) of one of the two partial regions P and the region SpA(t)a of the other of the two partial regions P are arranged continuously in the second direction Dy. A region StA4 illustrated in FIG. 5 is a region in which the region SpA4b of the partial region P1 and the region SpA4a of the partial region P11 are arranged continuously. A region StA7 is a region in which the region SpA7b of the partial region P1 and the region SpA7a of the partial region P11 are arranged continuously. A region StA10 is a region in which the region SpA10b of the partial region P1 and the region SpA10a of the partial region P11 are arranged continuously. FIG. 5 exemplarily illustrates the regions StA4, StA7, and StA10 formed with the partial regions P1 and P11. Regions similar thereto are formed with two partial regions P adjacent to each other in the second direction Dy.

With the positional shift in the first direction Dx between two partial regions P adjacent to each other in the second direction Dy, a plurality of partial regions P are arranged along a straight line having an acute angle θ1 relative to the first direction Dx. In FIG. 5, a line DL1 connecting the markers M1, M11, and M21 is illustrated with a dashed line to indicate that the arrangement of the partial regions P1, P11, and P21 has the acute angle θ1 relative to a line Lx along the first direction Dx. A line DL2 connecting the markers M2, M12, and M22 is illustrated with a dashed line to indicate that the arrangement of the partial regions P2, P12, and P22 has the acute angle θ1 relative to the line Lx. A line DL3 connecting the markers M3, M13, and M23 is illustrated with a dashed line to indicate that the arrangement of the partial regions P3, P13, and P23 has the acute angle θ1 relative to the line Lx.

Since a plurality of partial regions P are arranged along a straight line having the acute angle θ1 relative to the first direction Dx due to the positional shift in the first direction Dx between two partial regions P adjacent to each other in the second direction Dy, the partial regions P are arranged along a straight line having an acute angle θ2 relative to the second direction Dy. Although only the acute angle θ2 between the line DL1 and a line Ly along the second direction Dy is illustrated in FIG. 5, the other lines DL2 and DL3 have the acute angle θ2 relative to the second direction Dy as well.

Part of a partial region P is disposed in a gap region that is not large enough for one partial region due to the shift between adjacent partial regions P. That is, any pixels Spix disposed outside the display region AA among the pixels Spix included in the partial region P are omitted.

The acute angles θ1 and θ2 are set in accordance with a "shift amount in the first direction Dx between partial regions P adjacent to each other in the second direction Dy", a "ratio between the width D4 (refer to FIG. 6) of each pixel Spix in the first direction Dx and a width D3 (refer to FIG. 6) thereof in the second direction Dy", and "the number (α) of pixels Spix included in each partial region P and arranged in the second direction Dy". The "shift amount in the first direction Dx between partial regions P adjacent to each other in the second direction Dy" can be represented as the number q of pixels Spix. Specifically, $\tan(\theta1)=(q \times D4)/(\alpha \times D3)$ holds. The acute angle θ2 is 90°-θ1. In a case of q=1, $\theta2=a\tan\{(D4/D3)/\alpha\}$ holds. In a case of q=1 and D4:D3=3:1, $\theta2=a\tan\{3/\alpha\}$ holds.

The angle θ2 is preferably, for example, in a range of 10° to 20° but not limited thereto and may be an acute angle not included in the angle range. Moire tends to be more reliably reduced when "the number (α) of pixels Spix included in each partial region P and arranged in the second direction Dy" is a prime number. In the present example, a pixel means a region enclosed by scanning lines and signal lines. More specifically, it is typical in a display device of this kind that a plurality of scanning lines are provided in the first direction Dx, a plurality of signal lines are provided in the second direction Dy, and pixel electrodes and color filters are provided between the scanning lines and the signal lines, thereby forming pixels. In the present embodiment, a pixel is a region Area partitioned by center lines of adjacent scanning lines G1 and G2 and center lines of adjacent signal lines S1 and S2. The center line of each wiring line means a virtual line extending through the center of a predetermined width part (general part) that occupies a most part of the wiring line. Even if the wiring line includes a part having a larger or smaller width than the other parts, the center line is a line obtained by extending the center line of the predetermined width part adjacent to the larger or smaller width part.

The number of pixels Spix arranged in the second direction Dy in the partial region P described with reference to FIG. 6 is 13. In the example illustrated in FIG. 5, the pixels Spix are arranged from one side to the other side in the second direction Dy in the order of the first pixel Rpix, the second pixel Gpix, and the third pixel Bpix. In the example illustrated in FIG. 5, the pixels Spix of the same kind are arranged in the first direction Dx. Thus, each first pixel Rpix in the partial regions P1, P11, and P21 is a pixel Spix having the coordinate v in the second direction Dy. Each second pixel Gpix in the partial regions P2, P12, and P22 is a pixel Spix having the coordinate v in the second direction Dy. Each third pixel Bpix in the partial regions P3, P13, and P23 is a pixel Spix having the coordinate v in the second direction Dy. According to the same principle, partial regions P in a non-illustrated region are arranged in the second direction Dy in the order of a partial region P in which each first pixel Rpix is a pixel Spix having the coordinate v in the second direction Dy, a partial region P in which each second pixel Gpix is a pixel Spix having the coordinate v in the second direction Dy, and a partial region P in which each third pixel Bpix is a pixel Spix having the coordinate v in the second direction Dy.

FIG. 8 is a diagram illustrating an exemplary form of a plurality of light-blocking members 21 provided on the light control panel 20 and slits 21a formed between the light-blocking members 21. The light control panel 20 illustrated in FIG. 3 includes the light-blocking members 21. As illustrated in FIG. 8, the light-blocking members 21 are arranged in the first direction Dx. The light-blocking members 21 have the same functions as the light-blocking members SM described with reference to FIGS. 1 and 2.

The slit 21a is formed between two light-blocking members 21 arranged adjacent to each other in the first direction Dx. Sides of the light-blocking members 21 facing each other with the slit 21a interposed therebetween extend along a straight line having the acute angle θ1 relative to the first direction Dx. Thus, the slit 21a is inclined at the acute angle θ1 relative to the first direction Dx. In other words, the slit 21a is inclined at the acute angle θ2 relative to the second direction Dy. When this configuration is taken into consideration, the light control panel 20 can be referred to as a light-blocking barrier, a light-blocking barrier panel, or a barrier panel.

Figure 22:
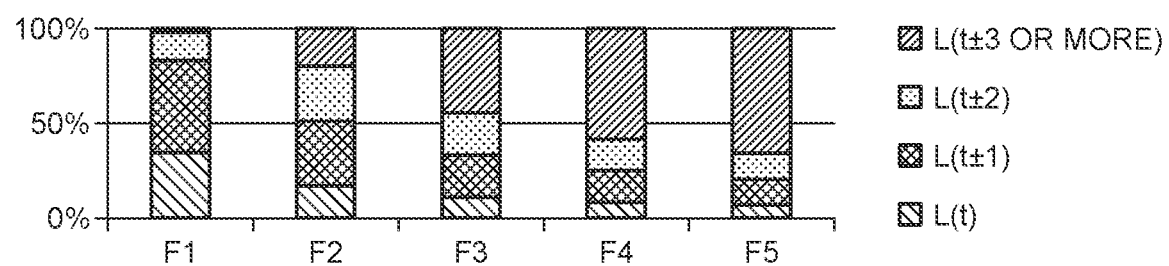
FIG. 22 is a graph illustrating a ratio of light $L(t)$ and a ratio of light $L(t\pm\eta)$ to light passing through a slit in each of output examples of five patterns among which a relation between the ratio of light $L(t)$ and the ratio of light $L(t\pm\eta)$ is different.
Figure 23:
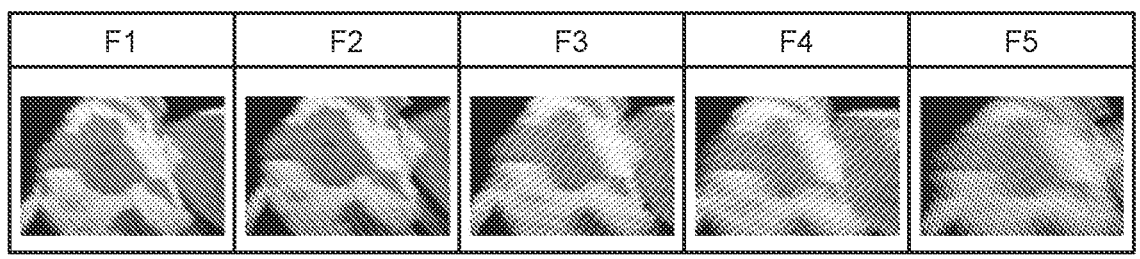
FIG. 23 is a diagram illustrating, in each of the output examples of the five patterns illustrated in the graph illustrated in FIG. 22, an exemplary image visually recognized at a viewpoint $E(t)$ due to the relation between the ratio of light $L(t)$ and the ratio of light $L(t\pm\eta)$ in the output example.

A width D1 of each slit 21a in the first direction Dx is set such that the "ratio of light L(t) passing through the slit 21a", which will be described later with reference to FIGS. 22 and 23, is as large as possible. Specifically, for example, the width D1 is smaller less than the width D4 (refer to FIG. 6) of each pixel Spix in the first direction Dx. A width D2 of the light-blocking member 21 in the first direction Dx between two slits 21a adjacent to each other in the first direction Dx corresponds to the width of each partial region P in the first direction Dx. The width of each partial region P in the first direction Dx depends on the number of pixels Spix included in the partial region P and arranged in the first direction Dx and the width D4 of each pixel Spix in the first direction Dx.

The display device 1 (refer to FIG. 3) receives light from the light source device 2 and outputs an image. The display device 1 includes the display panel 10 and the light control panel 20 that are layered. The display panel 10 has the display region AA to which output from each pixel Spix described above with reference to FIGS. 5 to 7 is applied. The light control panel 20 includes the light-blocking members 21 provided to form the slits 21a described with reference to FIG. 8. With this configuration, individual images corresponding to the viewpoints E(1), E(2), E(3), . . . , E(r) illustrated in FIG. 3 can be visually recognized at the viewpoints.

Figure 11:
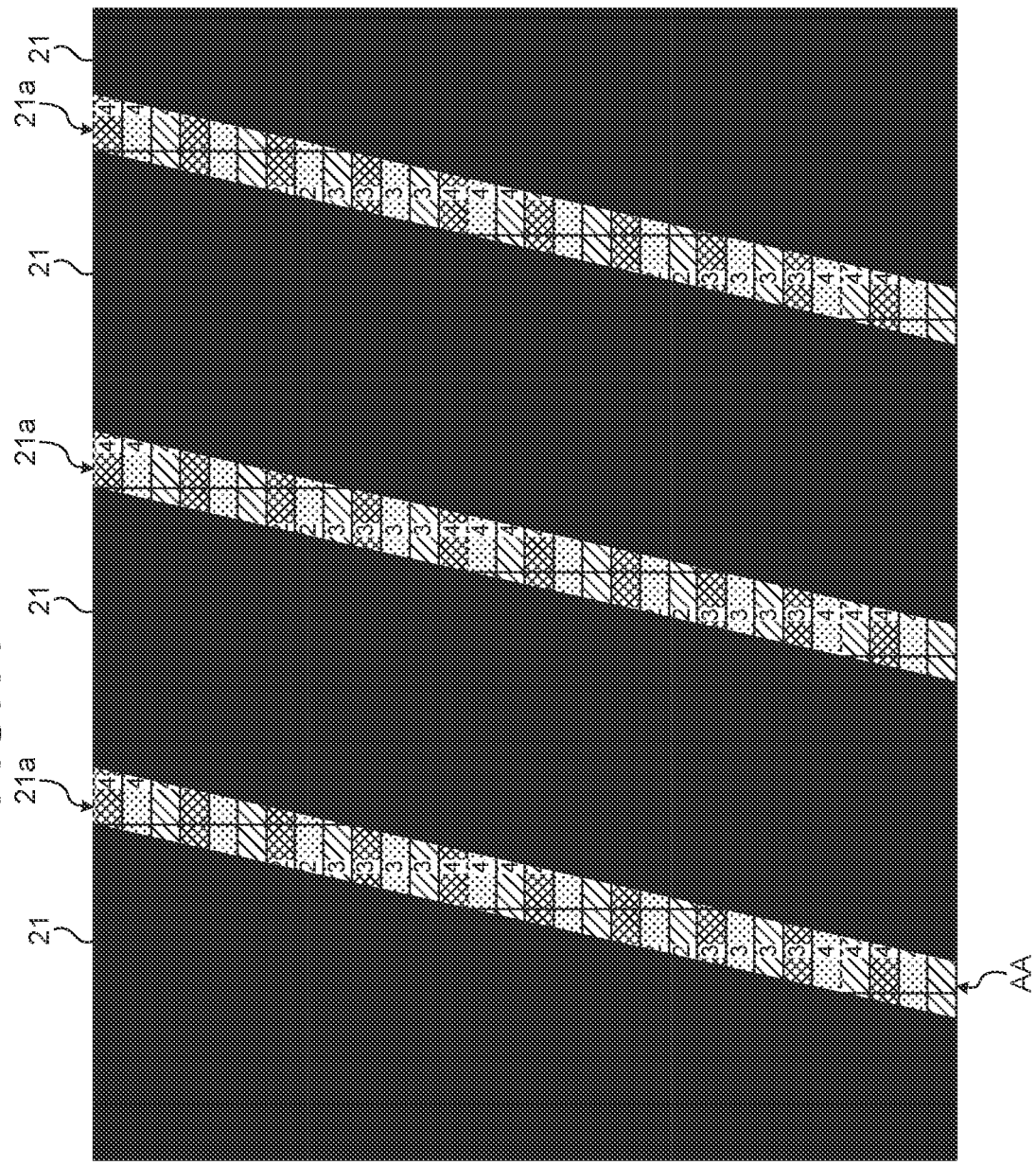
FIG. 11 is a schematic diagram illustrating output from the display device when viewed from a viewpoint E(3)

FIG. 9 is a schematic diagram illustrating output from the display device 1 when viewed from the viewpoint E(1). FIG. 10 is a schematic diagram illustrating output from the display device 1 when viewed from the viewpoint E(2). FIG. 11 is a schematic diagram illustrating output from the display device 1 when viewed from the viewpoint E(3). As illustrated in FIGS. 9, 10, and 11, the positional relation between the light-blocking members 21, the slits 21a, and the pixels Spix in the display region AA holds such that all of the pixels Spix that output an individual image to the viewpoint E(t) overlap the slits 21a when output from the display device 1 is viewed at the viewpoint E(t). In other words, output from each pixel Spix in the display region AA and the positions of the light-blocking members 21 and the slits 21a are set such that all of the pixels Spix that output individual images corresponding to the predetermined viewpoints E(1), E(2), E(3), . . . , E(r) overlap the slits 21a when the display device 1 is viewed from the viewpoints.

As exemplarily illustrated in FIGS. 9, 10, and 11, not only pixels Spix that output an individual image to the viewpoint E(t) but also pixels Spix that output individual images for an area from a viewpoint E(t−β) to a viewpoint E(t+β) overlap the slits 21a when output from the display device 1 is viewed at the viewpoint E(t). β is set in accordance with the width D1 of each slit 21a, the value of r, and any other condition. β is 2 in the example illustrated in FIGS. 9, 10, and 11.

In the area from the viewpoint E (t−β) to the viewpoint E(t+β), the value of (t−β) is replaced with r when (t−β) is zero. The value of (t−β) is replaced with r+(t−β) when (t−β) is a negative value. In a specific example of t=1 and β=2, (t−β) is −1. Thus, in a case of r=13, (t−β) is 13+(−1)=12 since the value of (t−β) is is a negative value.

In the example illustrated in FIG. 9, output from the display device 1 is viewed at the viewpoint E(t) and t is 1. In addition, β is 2. Thus, the display region AA and the slits 21a overlap such that the pixels Spix that output an individual image to the viewpoint E(1) occupy the broadest area of each slit 21a. Pixels Spix that output individual images to the area from the viewpoint E(t−β) to the viewpoint E(t+β), in other words, the viewpoint E(12), E(13), E(1), E(2), and E(3), are positioned in the slits 21a. With the same mechanism, since t is 2 in the example illustrated in FIG. 10, the display region AA and the slits 21a overlap such that pixels Spix that output an individual image to the viewpoint E(2) occupy the broadest area of each slit 21a. Pixels Spix that output individual images to the area from the viewpoint E(t−β) to the viewpoint E(t+β), in other words, the viewpoints E(13), E(1), E(2), E(3), and E(4), are positioned in the slits 21a.

When output from the display device 1 is viewed at the viewpoint E(t), the display region AA and the slits 21a overlap such that pixels Spix that output an individual image to the viewpoint E(t) occupy the broadest area of each slit 21a. Among pixels Spix that output individual images to the other viewpoints than the viewpoint E(t), pixels Spix for a viewpoint disposed closer to the pixels Spix that output an individual image to the viewpoint E(t) occupy a broader area of each slit 21a.

When (t−β)≥1 and (t+β)≤r are satisfied, the range from (t−β) to (t+β) includes "(t−β), (t−(β1)), . . . , t, . . . , (t+(β−1)), (t+β)"1. In the example illustrated in FIG. 11, since t is 3, the display region AA and the slits 21a overlap such that pixels Spix that output an individual image to the viewpoint E(3) occupy the broadest area of each slit 21a. Pixels Spix that output individual images to the area from the viewpoint E(t−β) to the viewpoint E(t+α), in other words, the viewpoints E(1), E(2), E(3), E(4), and E(5), are positioned in the slits 21a.

When (t+β) is a negative value exceeding r, the value of (t+β) is replaced with (t+β−r). Although not illustrated, for example, when t is 13, the display region AA and the slits 21a overlap such that pixels Spix that output an individual image to the viewpoint E(13) occupy the broadest area of each slit 21a. Pixels Spix that output individual images to the area from the viewpoint E(t−β) to the viewpoint E(t+β), in other words, the viewpoints E(11), E(12), E(13), E(1), and E(2) are positioned in the slits 21a.

Although the above description assumes that the partial region P has a configuration described with reference to FIG. 6, the number and disposition of pixels Spix that are included in a partial region and output individual images to the respective viewpoints E(1), E(2), E(3), . . . , E(r) are not limited to the above-described specific aspect of the partial region P.

Figure 12:
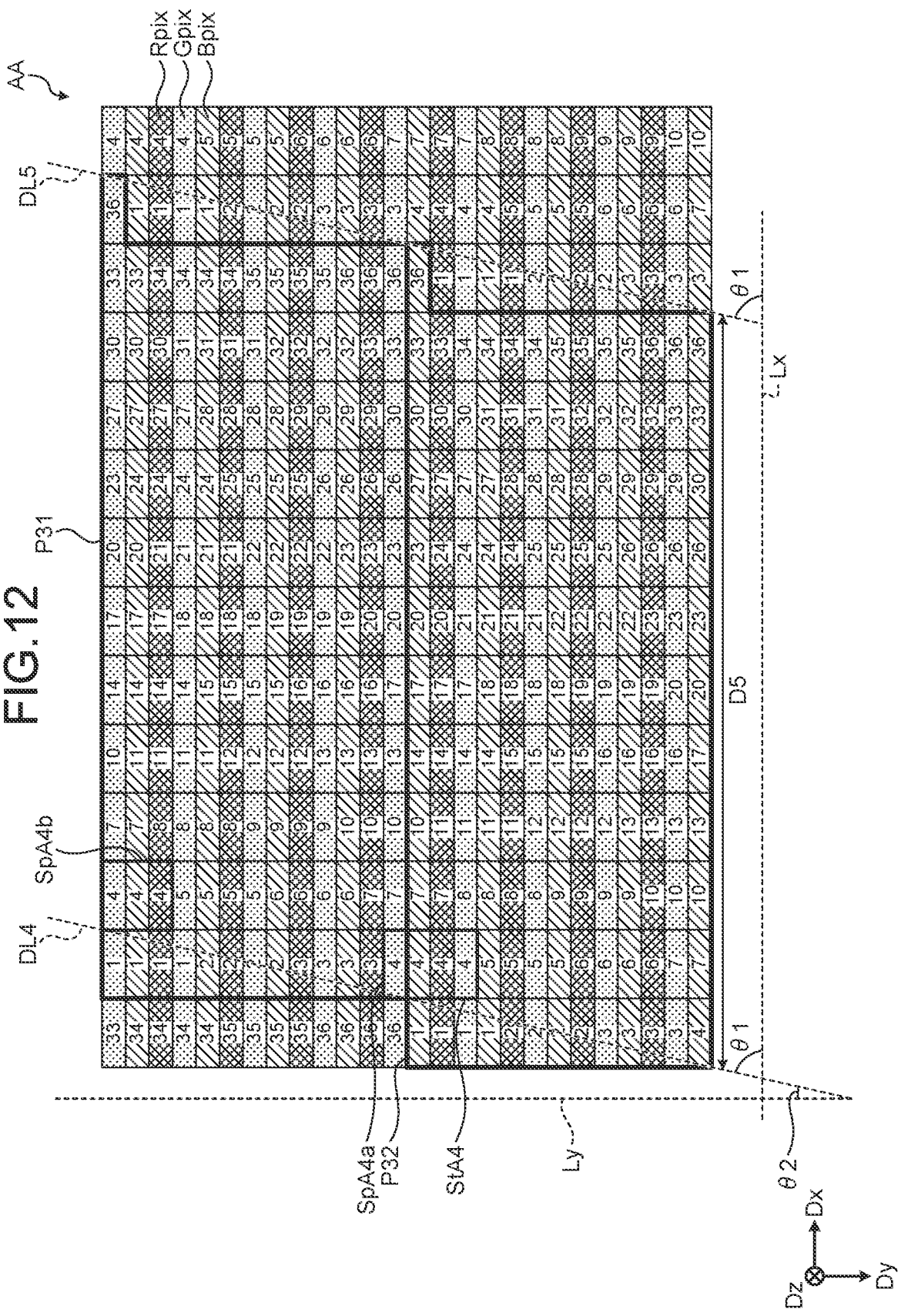
FIG. 12 is a diagram illustrating exemplary partial regions different from the partial region P described with reference to FIG. 6.

FIG. 12 is a diagram illustrating exemplary partial regions P31 and P32 different from the partial region P described with reference to FIG. 6. The partial regions P31 and P32 illustrated in FIG. 12 each include pixels Spix of 36×4=144. Thus, r is 36 in the example illustrated in FIG. 12.

The partial regions P31 and P32 are the same as the above-described partial region P in that the number of pixels Spix included in the partial regions P31 and P32 and arranged in the second direction Dy is 13, four pixels Spix that output an individual image to one viewpoint E(t) are arranged continuously in the second direction Dy, disposition of pixels Spix that output an individual image to one viewpoint E(t) is cycled when four pixels Spix that output an individual image to one viewpoint E(t) cannot be arranged continuously in the second direction Dy, and the partial regions P31 and P32 adjacent to each other in the second direction Dy are shifted from each other in the first direction Dx by one pixel Spix (the width D4).

In the partial regions P31 and P32 illustrated in FIG. 12, one of pixels Spix that output an individual image to a viewpoint E(36) provided so as to protrude toward one end in the first direction Dx. Thus, in the example illustrated in FIG. 12, the positions of partial regions adjacent to each other in the first direction Dx are shifted from each other in the second direction Dy by one pixel Spix (the width D3). Not only in the partial regions P31 and P32 illustrated in FIG. 12 but also in a partial region in which a plurality of pixels Spix are disposed to have a non-rectangular shape with one or more pixels Spix protruding toward one end in the first direction Dx, the positions of partial regions adjacent to each other in the first direction Dx are shifted from each other in the second direction Dy based on the same principle.

As described above, the number of pixels Spix included in each of the partial regions P31 and P32 and arranged in the second direction Dy is 13 as in the partial region P. Thus, the inclination relative to the first direction Dx due to arrangement of the partial regions P31 and P32 illustrated in FIG. 12 in the second direction Dy is the same as the above-described inclination relative to the first direction Dx due to arrangement of the partial regions P1, P11, P21, . . . in the second direction Dy. Specifically, lines DL4 and DL5 each passing through the same apex shared by the partial regions P31 and P32 have the acute angle θ1 relative to the line Lx. The lines DL4 and DL5 have the acute angle θ2 relative to the line Ly.

A width D5 of each of the partial regions P31 and P32 in the first direction Dx depends on the number (12) of pixels Spix included in each of the partial regions P31 and P32 and arranged in the first direction Dx and the width D4 of each pixel Spix in the first direction Dx. When the partial regions P31 and P32 illustrated in FIG. 12 are employed, the width of each light-blocking member 21 in the first direction Dx, which is positioned between two slits 21a described with reference to FIG. 8, corresponds to the width D5.

A mechanism that achieves output from the display region AA described with reference to FIG. 5 will be described below with reference to FIGS. 13 and 14.

Figure 13:
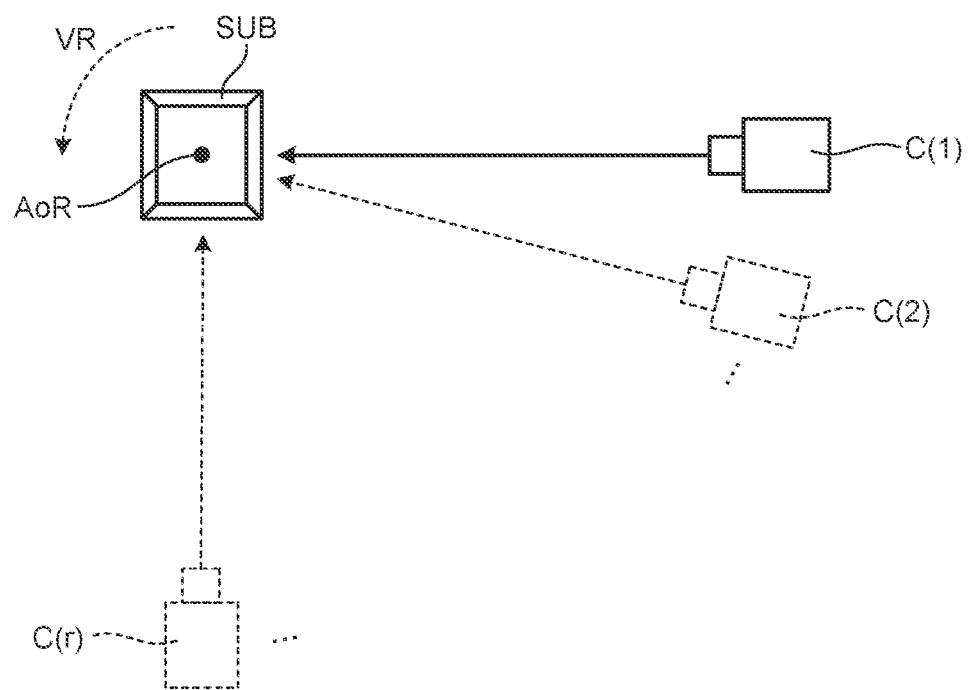
FIG. 13 is a schematic diagram illustrating a relation between a subject and each image capturing device.

FIG. 13 is a schematic diagram illustrating the relation between a subject SUB and each of image capturing devices C(1), C(2), . . . C(r). As illustrated in FIG. 13, image data for achieving output from the display region AA is generated by capturing images of the subject SUB with the image capturing devices C(1), C(2), . . . C(r). The image capturing devices C(1), C(2), . . . C(r) capture images of the subject SUB at different angles. The image capturing devices C(1), C(2), . . . C(r) are preferably sequentially arranged at positions along an arc centered at a point AoR in the subject SUB.

Image data for achieving output from the display region AA may be generated by fewer than r image capturing devices. For example, the image capturing device C(1) captures an image of the subject SUB once. Thereafter, the subject SUB is rotated by a predetermined angle in a rotational direction VR centered at the point AoR and the image capturing device C(1) captures an image of the subject SUB again, and such a process is repeated (r−1) times. The predetermined angle corresponds to the angle difference between the image capturing device C(1) and the image capturing device C(2) relative to the point AoR. Thus, the same image capturing result as in a case in which image data is generated by capturing images of the subject SUB with the image capturing devices C(1), C(2), . . . C(r) can be obtained. The same image capturing result as in a case in which image data is generated by capturing images of the subject SUB with the image capturing devices C(1), C(2), . . . C(r) can be obtained by shifting an image capturing angle of the image capturing device C(1) relative to the subject SUB by the predetermined angle instead of rotating the subject SUB.

Figure 14:
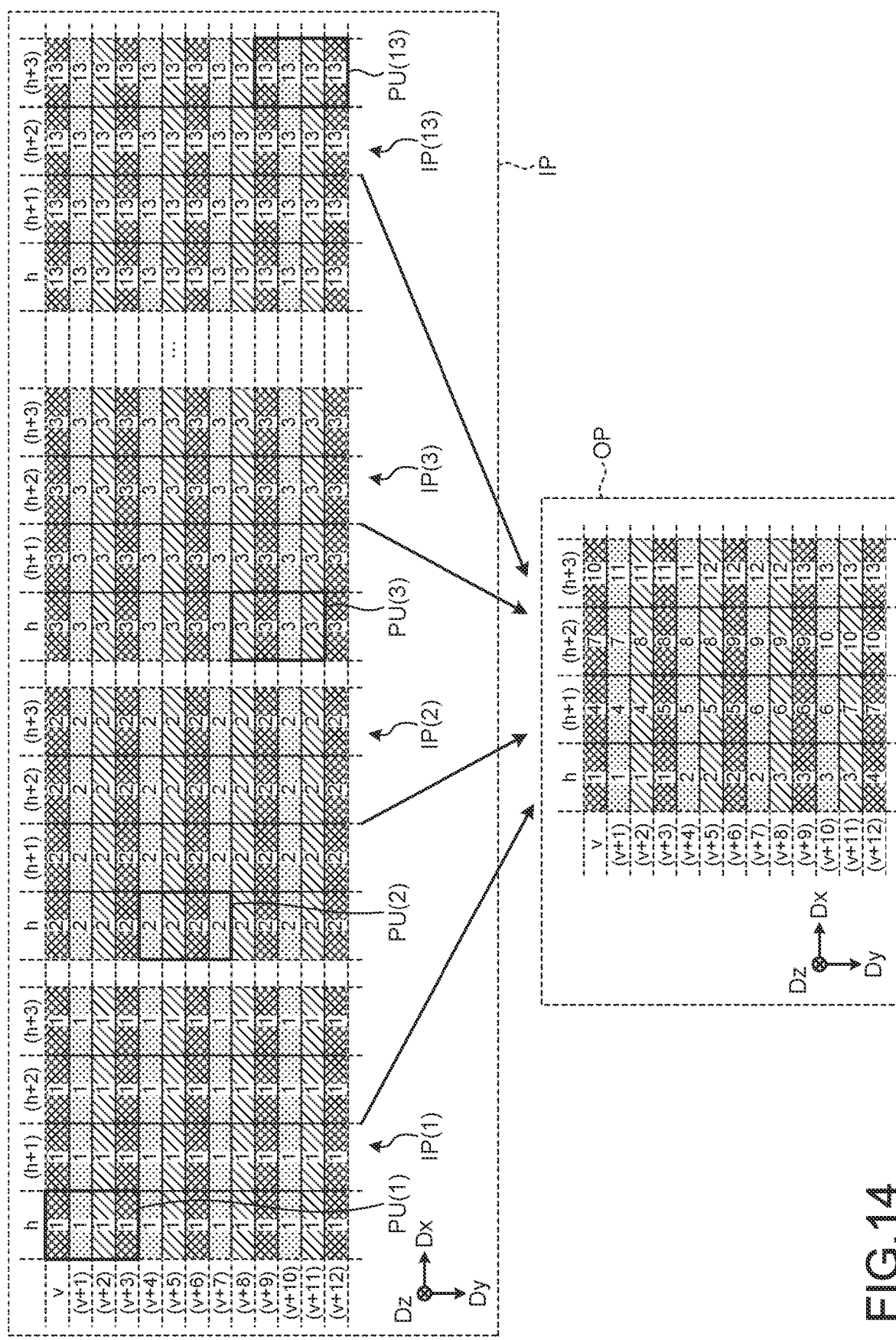
FIG. 14 is a schematic diagram illustrating a relation between an input image and an output image described with reference to FIG. 3.

FIG. 14 is a schematic diagram illustrating the relation between the input image IP and the output image OP described above with reference to FIG. 13. The input image IP includes r input images IP(1), . . . , IP(r), wherein r corresponds to the number (r) of viewpoints E. FIG. 14 exemplarily illustrates a case of r=13. The output image OP is one set of image data values that can be output from the display region AA of one display panel 10. For easiness of understanding in description with reference to FIG. 14, the resolution of each of the input images IP(1), . . . , IP(r) and the colors and disposition of pixels Spix thereof are the same as the resolution of the output image OP and the colors and disposition of pixels Spix thereof. Specifically, FIG. 14 exemplarily illustrates a pixel region corresponding to the partial region P described with reference to FIG. 6 and including pixels Spix of DxxDy=4×13.

The signal processor 30 described above with reference to FIG. 4 extracts part of each of r input images IP(1), . . . , IP(r), wherein r corresponds to the number (r) of viewpoints E. The signal processor 30 generates the output image OP by combining the parts extracted from the respective input images IP(1), . . . , IP(r). Assignment of each pixel Spix included in the parts of the respective input images IP(1), . . . , IP(r) to a corresponding one of the pixels Spix in the output image OP is determined in advance. In description with reference to FIG. 14, the number (any of 1 to 13) of the viewpoint E(t), which is provided to each of the partial regions P described with reference to FIG. 6 indicates the allocation determined in advance.

In a process of generating the output image OP based on the input image IP, the signal processor 30 first performs a setting process of setting t to an initial value (1). The signal processor 30 performs an identification process of identifying the coordinates of each pixel Spix assigned to the viewpoint E(t) in the output image OP. The signal processor 30 performs an acquisition process of acquiring, from the input image IP(t) corresponding to the value of t, a gradation value set for a pixel Spix having the same coordinates as the coordinates identified in the identification process. The signal processor 30 performs an application process of applying the gradation value acquired in the acquisition process to the output image OP. In the application process, the gradation value is applied such that the coordinates of the pixel Spix the gradation value of which is acquired in the input image IP match the coordinates of a pixel Spix in the output image OP to which the gradation value is applied.

For example, the coordinates of the pixels Spix assigned to the viewpoint E(1) in the output image OP illustrated in FIG. 14 are (Dx, Dy)=(h, v), (h, (v+1)), (h, (v+2)), and (h, (v+3)). Thus, the signal processor 30 acquires gradation values set to the respective pixels Spix in an extraction region PU(1) including (Dx, Dy)=(h, v), (h, (v+1)), (h, (v+2)), and (h, (v+3)) in the input image IP(1), and applies the acquired gradation values to (Dx, Dy)=(h, v), (h, (v+1)), (h, (v+2)), and (h, (v+3)) in the output image OP.

After the application process is completed, the signal processor 30 performs an addition process of adding 1 to t. After the addition process, the signal processor 30 performs the identification process, the acquisition process, and the application process again. The signal processor 30 repeats the addition process until the value t following the addition process becomes equal to the value r, and completes the process of generating the output image OP based on the input image IP upon completion of the identification process, the acquisition process, and the application process performed after the last addition process.

For example, the coordinates of the pixels Spix assigned to the viewpoint E(2) in the output image OP illustrated in FIG. 14 are (Dx, Dy)=(h, (v+4)), (h, (v+5)), (h, (v+6)), and (h, (v+7)). Thus, the signal processor 30 acquires gradation values set to the respective pixels Spix in an extraction region PU(2) including (Dx, Dy)=(h, (v+4)), (h, (v+5)), (h, (v+6)), and (h, (v+7)) in an input image IP(2), and applies the acquired gradation values to (Dx, Dy)=(h, (v+4)), (h, (v+5)), (h, (v+6)), and (h, (v+7)) in the output image OP. According to the same principle, the signal processor 30 acquires gradation values set to the respective pixels Spix in an extraction region PU(3) including (Dx, Dy)=(h, (v+8)), (h, (v+9)), (h, (v+10)), and (h, (v+11)) in an input image IP(3), and applies the acquired gradation values to (Dx, Dy)=(h, (v+8)), (h, (v+9)), (h, (v+10)), and (h, (v+11)) in the output image OP. Subsequently, up to an extraction region PU(13) of the input image IP(13), the signal processor 30 acquires gradation values set to some pixels Spix in the input image IP(t) and applies the acquired gradation values to the corresponding coordinates in the output image OP.

Although FIG. 14 exemplarily illustrates a pixel region corresponding to the partial region P described with reference to FIG. 6 and including pixels Spix of DxxDy=4×13, the resolutions of the input image IP and the output image OP are often higher than that in reality. When the input image IP and the output image OP have higher resolutions, the signal processor 30 applies the process of generating the output image OP based on the input image IP, which is described above with reference to FIG. 14, to each of a plurality of partial regions (for example, the partial regions P1, P2, P3, P11, P12, P13, P21, P22, P23, . . . ) described with reference to FIGS. 5 and 7. Specifically, the signal processor 30 applies, to the input image IP and the output image OP, similar partial regions to the partial regions (for example, the partial regions P1, P2, P3, P11, P12, P13, P21, P22, P23, . . . ) that are applied to the display region AA. Then, the signal processor 30 applies, for each of the partial regions, the process of generating the output image OP based on the input image IP, which is described above with reference to FIG. 14.

The resolution of the output image OP and the colors and disposition of pixels Spix thereof are the same as the number of pixels Spix included in the display region AA (display resolution) and the colors and disposition thereof. However, the resolution of the input image IP and the colors and disposition of pixels Spix thereof do not necessarily need to be the same as the resolution of the output image OP and the colors and disposition of pixels Spix thereof at the timing of inputting to the signal processor 30. When the resolution of the input image IP and the colors and disposition of pixels Spix thereof are not the same as the resolution of the output image OP and the colors and disposition of pixels Spix thereof, the signal processor 30 performs a conversion process of setting the resolution of the input image IP and the colors and disposition of pixels Spix thereof to those of the output image OP. For example, nearest neighbor interpolation, linear interpolation, and other image interpolation processing are applicable as specific image processing performed in the conversion process.

The signal processor 30 is a circuit having functions to perform the processes included in the above-described process of generating output image OP based on input image IP and the conversion process. The signal processor 30 may be configured as one circuit having all functions or may be configured as a combination of a plurality of circuits each having some of the functions. The signal processor 30 may be mounted on a substrate included in the display panel 10 or may be mounted on another substrate (for example, a flexible substrate or the like) coupled to the display panel 10. Among the above-described processes performed by the signal processor 30, the processes other than the acquisition process may be performed by an external apparatus (host). The signal processor 30 only needs to perform at least the application process.

A more detailed exemplary configuration of the display device 1 described above with reference to FIG. 3 will be described below with reference to FIG. 15.

Figure 15:
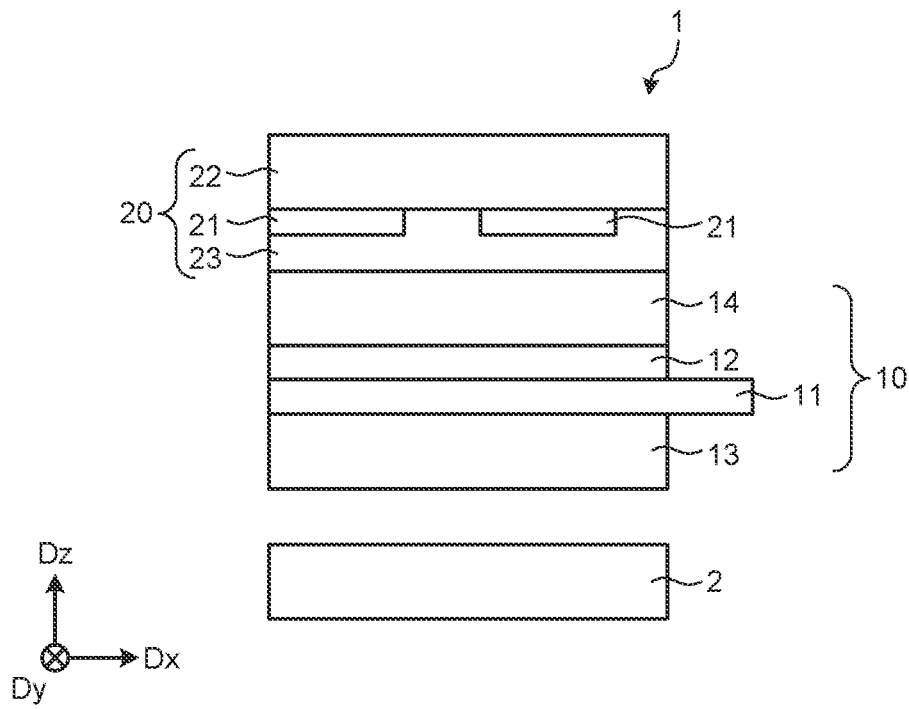
FIG. 15 is a schematic diagram illustrating a more detailed exemplary configuration of the display device illustrated in FIG. 3.

FIG. 15 is a schematic diagram illustrating a more detailed exemplary configuration of the display device 1 illustrated in FIG. 3. The display panel 10 includes a first substrate 11, a second substrate 12, a first polarization layer 13, and a first polarization layer 14. The first substrate 11 is a light-transmitting substrate on which pixel electrodes, switching elements, signal lines, scanning lines, a source driver, and a gate driver are mounted. The pixel electrodes are individually provided for the respective pixels Spix. Each of the switching elements has a source and a drain, and one of the source and the drain is coupled to a corresponding one of the pixel electrodes. The other of the source and drain of the switching element is coupled to a corresponding one of the signal lines. Each of the scanning lines transmits a drive signal to be provided to the gate of the switching element. The source driver is configured to output pixel signals corresponding to the output image OP to the signal lines in order to provide the pixel signals to the pixels Spix. The gate driver is configured to output the drive signal to each scanning line in accordance with the output timing of the pixel signals. The second substrate 12 is a light-transmitting substrate provided with, for example, a color filter configured to transmit light in a color corresponding to a spectrum peak of light output from each pixel Spix. The color filter may be provided on the first substrate 11. A common electrode having a constant potential and shared by a plurality of pixels Spix is provided on either one of the first substrate 11 and the second substrate 12. Although not illustrated, liquid crystal is enclosed between the first substrate 11 and the second substrate 12. The first polarization layer 13 and the first polarization layer 14 are each a polarization plate or polarization film that transmits light in a predetermined polarization direction and blocks light in polarization directions other than the predetermined polarization direction. The first polarization layer 13 is provided on the light source device 2 side of the first substrate 11. The first polarization layer 14 is provided on the light control panel 20 side of the second substrate 12. The luminance of light transmitted through the display panel 10 is controlled for each pixel Spix by a combination of the following: control of the polarization direction of light by liquid crystal molecules having its orientation controlled in accordance with the pixel signal; and the polarization direction of light transmitted through the first polarization layer 13 and the first polarization layer 14.

The light control panel 20 includes the light-blocking members 21, a substrate 22, and a bonding layer 23. The light-blocking member 21 is the light-blocking member 21 described above with reference to FIGS. 8 to 11. The light-blocking member 21 is formed of, for example, black synthesis resin or chromium (Cr) fabricated to reduce light reflection at the outer peripheral surface but is not limited thereto and may be formed of any other light-blocking material. The substrate 22 is a light-transmitting substrate to which the light-blocking members 21 are fixed. The substrate 22, the first substrate 11, and the second substrate 12 are, for example glass substrates but may be light-transmitting substrates of any other material. The bonding layer 23 is a bonding layer that bonds one surface of the substrate 22 provided with the light-blocking members 21 to one surface of the display panel 10 provided with the first polarization layer 14. The bonding layer 23 is preferably a bonding agent that has an excellent light-transmitting property. The bonding layer 23 may be formed of light-transmitting film, such as an optical clear adhesive (OCA), which is adhesive on both surfaces.

Although a specific exemplary configuration of the display device 1 is described above with reference to FIG. 15, a specific configuration of the display device according to the present disclosure is not limited to the configuration described with reference to FIGS. 3 and 15. Other exemplary forms of the display device according to the present disclosure will be described below with reference to FIGS. 16 to 20.

Figure 16:
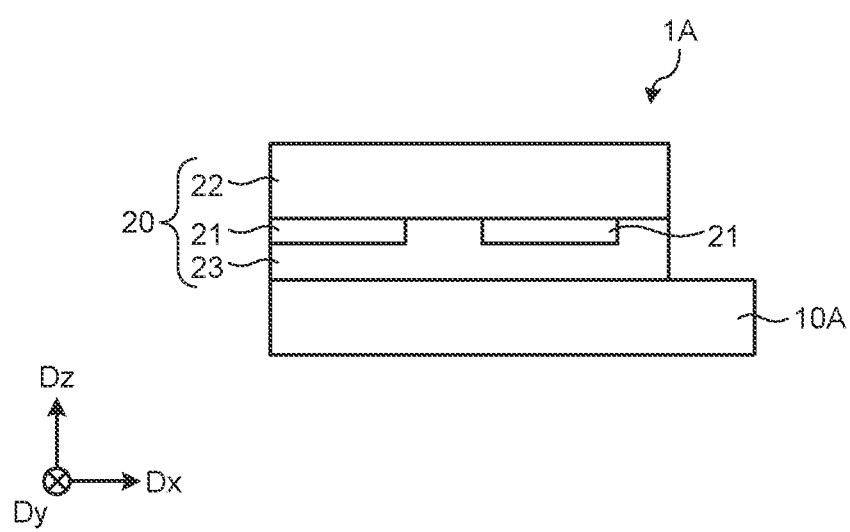
FIG. 16 is a schematic diagram illustrating an exemplary configuration of the display device.

FIG. 16 is a schematic diagram illustrating an exemplary configuration of a display device 1A. As in the display device 1A, a display device 10A may be provided in place of the combination of the light source device 2 and the display panel 10 in the display device 1. The display device 10A is a selfluminous display panel. Specifically, the display device 10A is, for example, an organic light emitting diode (OLED) panel or a micro light emitting diode (LED) panel but not limited to any of these panels and may be a selfluminous display panel of another scheme. The display device 1A is the same as the display device 1 except for any feature otherwise described above.

Figure 17:
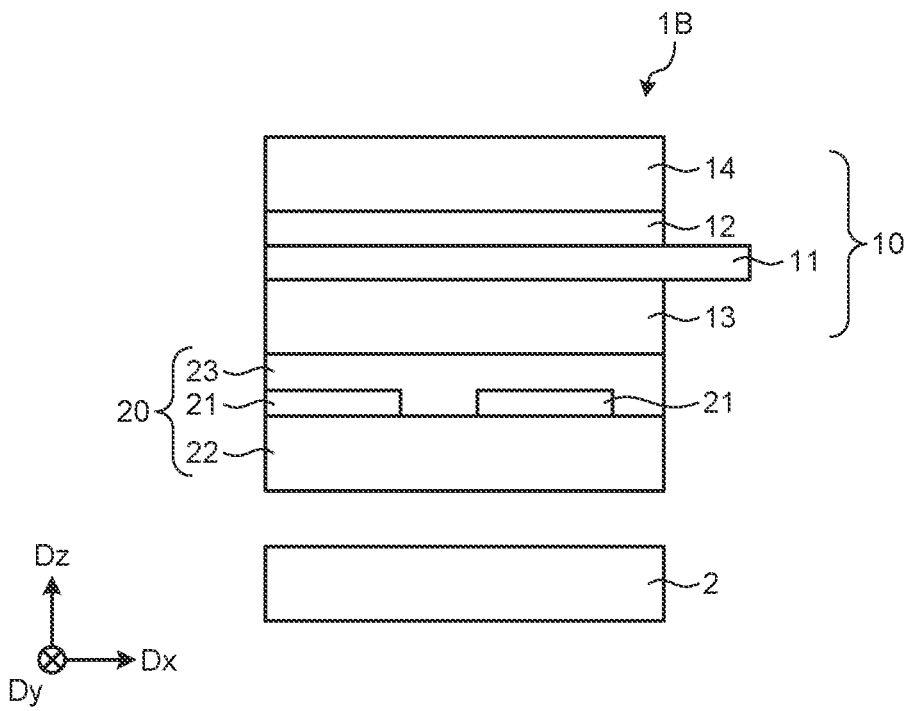
FIG. 17 is a schematic diagram illustrating an exemplary configuration of the display device.

FIG. 17 is a schematic diagram illustrating an exemplary configuration of a display device 1B. The display device 1B is the same as the display device 1 except that the positional relation of the display panel 10 and the light control panel 20 with respect to the light source device 2 is opposite thereto. In this manner, the positional relation of the display panel 10 and the light control panel 20 with the light source device 2 may be such that the display panel 10 is positioned closer to the light source device 2 as in the display device 1 illustrated in FIG. 15 or the light control panel 20 is positioned closer to the light source device 2 as in the display device 1B illustrated in FIG. 17. The display device 1B is the same as the display device 1 except for any feature otherwise described above.

Figure 18:
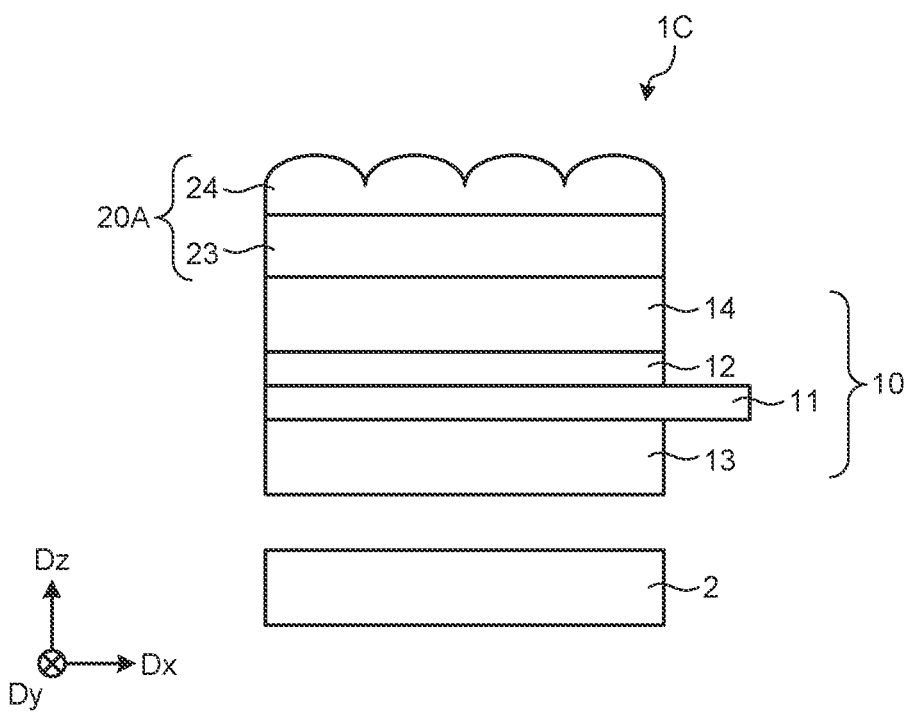
FIG. 18 is a schematic diagram illustrating an exemplary configuration of the display device.

FIG. 18 is a schematic diagram illustrating an exemplary configuration of a display device 1C. The display device 1C includes a light control panel 20A in place of the light control panel 20 in the display device 1. The light control panel 20A includes the bonding layer 23 and a lens 24. The lens 24 is an optical member having one surface on the user side on which a convex-lens curved shape is formed. With the convex-lens curved shape on the one surface, the lens 24 refracts light emitted from the light source device 2 and passing through the display panel 10 such that the light converges to a focal point at the viewpoint E(t). With this, the lens 24 causes reaching and non-reaching of light, as in the above-described relation between each pixel Spix and the corresponding viewpoint E(t) achieved by the light-blocking members 21 that block light to prevent light from reaching the viewpoint E(t) (non-reaching) and the slits 21a that transmit light to allow light to reach the viewpoint E(t) (reaching). Thus, the lens 24 provides the same effects as those of the light-blocking members 21 and the slits 21a described above in effect. The bonding layer 23 of the display device 1C is the same as the above-described bonding layer 23 except that the bonding layer 23 bonds the other surface of the lens 24 and the first polarization layer 14. The display device 1C is the same as the display device 1 except for any feature otherwise described above.

FIG. 19 is a schematic diagram illustrating an exemplary configuration of a display device 1D. The display device 1D includes a light control panel 20B in place of the light control panel 20A in the display device 1C described above with reference to FIG. 18. A lens 24 included in the light control panel 20B is the same as the lens 24 included in the light control panel 20A except that the lens 24 of the light control panel 20B is plane on the user side and has a convex-lens curved shape on the opposite side. The lens 24 of the light control panel 20B has a surface on which the convex-lens curved shape is formed and that is bonded to the first polarization layer 14 with a bonding layer 23A interposed therebetween. The bonding layer 23A is the same as the bonding layer 23 of the light control panel 20A described above except that the bonding layer 23A has a bonding region formed to rim the lens 24 in a plan view of a plane orthogonal to the third direction Dz and having a hollow space inside. The display device 1D is the same as the display device 1C except for any feature otherwise described above.

FIG. 20 is a schematic diagram illustrating an exemplary configuration of a display device 1E. The display device 1E includes a light control panel 20C in place of the light control panel 20 in the display device 1. The light control panel 20C is a liquid crystal display panel on which a blocking region that blocks light like the light-blocking members 21 and a transmission region that transmits light like the slits 21a can be formed. The light control panel 20C includes a first substrate 25, a second substrate 26, and a polarization layer 27. The first substrate 25 is the same as the first substrate 11 described above. The second substrate 26 is the same as the second substrate 12 described above except that the second substrate 26 is provided with no color filter. Although not illustrated, liquid crystal is enclosed between the first substrate 25 and the second substrate 26. The polarization layer 27 has the same configuration as those of the first polarization layer 13 and the first polarization layer 14 described above. The polarization layer 27 is provided opposing the first polarization layer 14 with the first substrate 25 and the second substrate 26 interposed therebetween. Blocking and transmission of light passing through the light control panel 20C is controlled for each pixel provided on the light control panel 20C by a combination of the following: control of the polarization direction of light by liquid crystal molecules having its orientation controlled in accordance with the pixel signal; and the polarization direction of light transmitted through the first polarization layer 14 and the polarization layer 27. The width of each pixel in the first direction Dx, which is provided at the light control panel 20C is preferably smaller than that of each pixel Spix. The display device 1E is the same as the display device 1 except for any feature otherwise described above.

In the above description, four pixels Spix that output an individual image to one viewpoint E(t) are arranged continuously in the second direction Dy, but five pixels Spix or more or three pixels Spix or less that output an individual image to one viewpoint E(t) may be continuously arranged in the second direction Dy.

Figure 21:
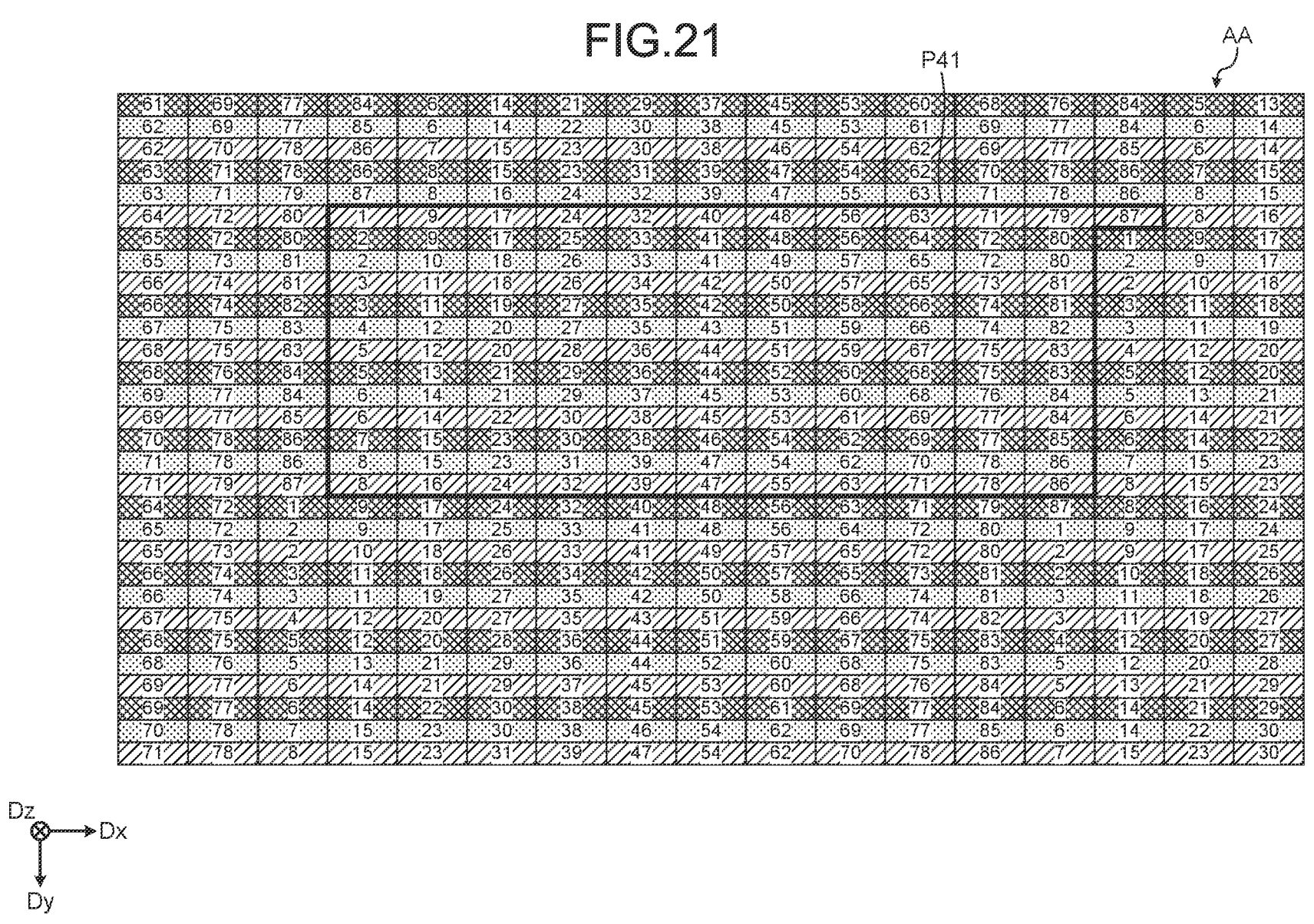

FIG. 21 is a diagram illustrating an exemplary partial region P41 different from the partial region P described with reference to FIGS. 6 and 12. The partial region P41 illustrated in FIG. 21 includes 144 pixels Spix. In the example illustrated in FIG. 21, r is 87.

In the example illustrated in FIG. 21, the 144 pixels Spix output individual images to respective viewpoints E(1), ..., E(87). Since 144/87≈1.655, the number of pixels Spix assigned to one viewpoint E(t) is one or two. However, when images are captured from such a large number of viewpoints with r=87 by the method of acquiring image data (the input image IP) described above with reference to FIG. 13, images captured by the image capturing devices C(t±η) closely resemble an image captured by an image capturing device C(t) as the value of η is smaller. Thus, even when the number of pixels Spix assigned to one viewpoint E(t) is small like one or two, image outputting to the viewpoint E(t) can be achieved through mutual complement of an output image with pixels Spix assigned to viewpoints E(t±η).

When the accuracy of image outputting is taken into consideration, the above-described value η is preferably equal to or smaller than 2. The following describes, with reference to FIGS. 22 and 23, an exemplary image visually recognized at the viewpoint E(t) due to the relation between the ratio of pixels Spix assigned to the viewpoint E(t) and the ratio of pixels Spix assigned to the viewpoint E(t±η) to pixels Spix positioned in each slit 21a. As described above, light transmitted through a pixel Spix assigned to the viewpoint E(t) among pixels Spix positioned in each slit 21a is light L(t). Light transmitted through a pixel Spix assigned to the viewpoint E(t±η) among pixels Spix positioned in each slit 21a is light L(t±η).

FIG. 22 is a graph illustrating the ratio of light L(t) and the ratio of light L(t±η) to light passing through each slit 21a in each of output examples F1, F2, F3, F4, and F5 of five patterns among which the relation between the ratio of light L(t) and the ratio of light L(t±η) to light passing through each slit 21a is different.

In the output example F1, the ratio of light L(t) and the ratio of light L(t±1) are higher than in the output examples F2, F3, F4, and F5. In particular, in the output example F1, the proportion of light L(t±2), that is, the proportion from light L(t−2) to light L(t+2) occupies substantially 100% of light transmitted through the slit 21a. In the output example F2, the ratio of light L(t) and the ratio of light L(t±1) are higher than in the output examples F3, F4, and F5. In the output example F3, the ratio of light L(t) and the ratio of light L(t±1) are higher than in the output examples F4 and F5. In the output example F4, the ratio of light L(t) and the ratio of light L(t±1) are higher than in the output example F5.

FIG. 23 is a diagram illustrating, in each of the output examples F1, F2, F3, F4, and F5 of five patterns illustrated in the graph in FIG. 22, an exemplary image visually recognized at the viewpoint E(t) due to the relation between the ratio of light L(t) and the ratio of light L(t±η). As exemplarily illustrated in FIG. 23, an image with a clearer outline is visually recognized at the viewpoint E(t) as the ratio of light L(t) is higher. Even when the ratio of light L(t) is low, the minimal image accuracy required to output can be maintained in any output example since light L(t±η) acts to complement light L(t) through the above-described mutual complement, but in an output example (for example, the output example F5) in which light L(t±3 or more) occupies most of the output, an image is less clear than an output example in which light L(t±3 or more) occupies less than that.

When the phenomenon described with reference to FIGS. 22 and 23 is taken into consideration, the ratio of light L(t) passing through each slit 21a is preferably higher. For example, the example described above with reference to FIGS. 5 to 11 substantially corresponds to the output example F1. Excessive blur can be restrained when the ratio of light L(t) to light passing through each slit 21a is equal to or higher than 9.1%. Moreover, a visually recognized image at higher accuracy can be obtained when the ratio of light L(t) to light passing through each slit 21a is equal to or higher than 16.7%.

For example, in a case in which the width D1 of each slit 21a in the first direction Dx, which is described above with reference to FIG. 8, is equal to or larger than the width D4 (refer to FIG. 6) of each pixel Spix in the first direction Dx, the ratio of light L(t) to light passing through each slit 21a is lower than in a case in which the width D1 is smaller than the width D4. Thus, the ratio of light L(t) to light passing through each slit 21a is higher when the width D1 is smaller than the width D4. However, in a case in which the width D1 is equal to or larger than the width D4, the total amount of light passing through each slit 21a is larger than in a case in which the width D1 is smaller than the width D4, and therefore, the brightness of a visually recognized image is higher.

As described above, the configuration according to the present disclosure includes a display panel (for example, the display panel 10) including a plurality of pixels (pixels Spix) disposed in a matrix having a row-column configuration; and a light control panel (for example, the light control panel 20) configured to control light traveling from the display panel to a plurality of viewpoints (for example, the viewpoint E(n) and the viewpoint E(n+1), or the viewpoints E(1), . . . , E(r)) such that the light varies from viewpoint to viewpoint. The pixels include a first pixel (for example, first pixel Rpix) configured to output light in a first color and a second pixel (for example, second pixel Gpix) configured to output light in a second color. The first and second pixels are arranged in a column direction (the second direction Dy) orthogonal to the arrangement direction of the viewpoints. The width (for example, the width D4) of each pixel in a row direction (the first direction Dx) along the arrangement direction of the viewpoints is greater than the width (for example, the width D3) of the pixel in the column direction.

With this configuration, even when light from a plurality of pixels (pixels Spix) arranged in the row direction (first direction Dx) reaches different viewpoints, light in a plurality of colors from the pixels (pixels Spix) can more reliably reach the respective viewpoints since the first pixel (for example, first pixel Rpix) and the second pixel (for example, second pixel Gpix) are arranged in the column direction (second direction Dy). Thus, unintended coloring can be further reduced.

Since two or more of the pixels (pixels Spix) to each of which an image to be output to one viewpoint (viewpoint E(t)) is allocated are arranged continuously in the column direction (second direction Dy), the ratio of light L(t) to light passing through each slit 21a can be higher.

The light control panel (for example, the light control panel 20) includes light-blocking members (light-blocking members 21) that block light, and a slit (slit 21a) provided between the light-blocking members. With this configuration, the light control panel can have a simple configuration.

The slit (slit 21a) is inclined relative to the row direction (first direction Dx) and the column direction (second direction Dy), and the inclination angle (acute angle θ2) of the slit relative to the column direction is smaller than the inclination angle (acute angle θ1) of the slit relative to the row direction. With this configuration, moire can be more reliably reduced.

The light control panel (light control panel 20A or 20B) includes a lens (the lens 24) through which light converges to one viewpoint (viewpoint E(t)), the light traveling from two or more of the pixels (pixels Spix) to each of which an image to be output to the one viewpoint is allocated. With this configuration, the use efficiency of light from the pixels is increased.

The light control panel (light control panel 20C) includes a liquid crystal panel capable of forming a blocking region that blocks light and a transmission region that transmits light. With this configuration, the display panel (for example, the display panel 10) can be used so as to be switched between a first mode in which individual images are output to a plurality of viewpoints as described above and a second mode in which one image is output in the entire display region AA without limitation to viewpoints. In the second mode, the entire region of the liquid crystal panel included in the light control panel is controlled as the transmission region.

The configuration further includes a signal processor (the signal processor 30) configured to allocate data values to the pixels such that light reaching the viewpoints (viewpoints E(1), . . . , E(r)) is light from the pixels (pixels Spix) that output light forming images corresponding to the viewpoints. The signal processor provides, to the display panel (for example, the display panel 10), an output image (the output image OP) generated based on a plurality of input images (input images IP(1), . . . , IP(r)) corresponding to the viewpoints. The output image includes a plurality of partial regions (for example, partial regions P) in which data values (for example, the extraction regions PU(1), PU(2), PU(3), . . . ) corresponding to parts of the respective input images are arranged in the column direction (second direction Dy) in accordance with the arrangement order of the viewpoints. Thus, images corresponding to the viewpoints can be output from the display panel by preparing the input images.

r may be a natural number of 2 or more. η is a natural number.

It should be understood that the present disclosure provides any other effects achieved by aspects described above in the present embodiment, such as effects that are clear from the description of the present specification or effects that could be thought of by the skilled person in the art as appropriate.

What is claimed is:
1. A display device comprising:
a display panel including a display region having a plurality of pixels disposed in a matrix having a row-column configuration; and
a light control panel configured to control light traveling from the display panel to a plurality of viewpoints such that the light varies from viewpoint to viewpoint, the plurality of viewpoints including a first viewpoint and a second viewpoint, wherein
the pixels include a first pixel configured to output light in a first color and a second pixel configured to output light in a second color,
the first and second pixels are arranged in a column direction orthogonal to an arrangement direction of the viewpoints,
a width of each pixel in a row direction along the arrangement direction of the viewpoints is greater than a width of the pixel in the column direction,
the display region is divided into partial regions that includes a first partial region and a second partial region that borders on the first partial region in the column direction,
the first partial region is shifted from the second partial region in the row direction,
third pixels of the pixels corresponding to the first viewpoint and arranged in the column direction, and fourth pixels of the pixels corresponding to the second viewpoint are located in the first partial region,
fifth pixels of the pixels corresponding to the first viewpoint and arranged in the column direction, and sixth pixels of the pixels corresponding to the second viewpoint are located in the second partial region, the fourth pixels are divided into a first pixel group and a second pixel group, the first pixel group located at a first side of the first partial region, the first side being in contact with the second partial region, the second pixel group located at a second side opposite to the first side in the column direction, the sixth pixels are divided into a third pixel group and a fourth pixel group, the third pixel group located at a third side of the second partial region, the third side being in contact with the first partial region, the fourth pixel group located at a fourth side opposite to the third side in the column direction, and the first pixel group and the third pixel group are arranged in the column direction.

2. The display device according to claim 1, wherein two or more of the pixels to each of which an image to be output to one viewpoint is allocated are arranged continuously in the column direction.

3. The display device according to claim 1, wherein the light control panel includes light-blocking members that block light, and a slit provided between the light-blocking members.

4. The display device according to claim 3, wherein the slit is inclined relative to the row direction and the column direction, and an inclination angle of the slit relative to the column direction is smaller than an inclination angle of the slit relative to the row direction.

5. The display device according to claim 1, wherein the light control panel includes a lens through which light converges to one viewpoint, the light traveling from two or more pixels to each of which an image to be output to the one viewpoint is allocated.

6. The display device according to claim 1, wherein the light control panel includes a liquid crystal panel capable of forming a blocking region that blocks light and a transmission region that transmits light.

7. The display device according to claim 2, further comprising a signal processor configured to allocate data values to the pixels such that light reaching the viewpoints is light from the pixels that output light forming images corresponding to the viewpoints, wherein the signal processor provides, to the display panel, an output image generated based on a plurality of input images corresponding to the viewpoints, and the output image includes a plurality of partial images in which data values corresponding to parts of the respective input images are arranged in the column direction in accordance with an arrangement order of the viewpoints, each of the partial images corresponding to one of the partial regions.

8. The display device according to claim 1, wherein the first pixel group is located in a first column in the display region, and the second pixel group is located in a second column that is next to the first column.

9. The display device according to claim 8, wherein the third pixel group is located in the first column, the fourth pixel group is located in a third column that is next to the first column, and, the first column is between the second column and the third column.

\* \* \* \* \*